(12) United States Patent
Vastano et al.

(10) Patent No.: US 6,349,094 B1
(45) Date of Patent: *Feb. 19, 2002

(54) METHOD AND APPARATUS FOR WIRELESS COMMUNICATIONS EMPLOYING CONTROL FOR BROADCAST TRANSMISSION

(75) Inventors: John Andrew Vastano, Palo Alto; Lance Kazumi Uyehara, San Jose; Ujjal Kumar Ghoshtagore, Long Beach, all of CA (US)

(73) Assignee: mDiversity Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/383,160

(22) Filed: Aug. 25, 1999

Related U.S. Application Data

(63) Continuation-in-part of application No. 08/889,881, filed on Jul. 3, 1997.

(51) Int. Cl.[7] .......................... H04Q 7/00; H04B 7/212
(52) U.S. Cl. ........................................ 370/328; 370/337
(58) Field of Search ................................ 370/328, 329, 370/341, 337, 347, 431, 442, 334, 468, 345, 321, 326, 336; 455/13.3, 450

(56) References Cited

U.S. PATENT DOCUMENTS

| | | | | |
|---|---|---|---|---|
| 4,797,947 A | * | 1/1989 | Labedz | 455/422 |
| 5,168,502 A | * | 12/1992 | Millet | 455/443 |
| 5,233,643 A | * | 8/1993 | Naeini et al. | 370/329 |
| 5,243,598 A | | 9/1993 | Lee | |
| 5,515,378 A | | 5/1996 | Roy, III et al. | |
| 5,530,725 A | | 6/1996 | Koch | |
| 5,539,749 A | | 7/1996 | Eul | |
| 5,708,973 A | | 1/1998 | Ritter | |
| 5,805,576 A | * | 9/1998 | Worley, III et al. | 370/337 |
| 5,867,791 A | | 2/1999 | Chambert | |
| 6,137,784 A | * | 10/2000 | Wallerius et al. | 370/328 |

* cited by examiner

Primary Examiner—Ajit Patel
Assistant Examiner—Hanh Nguyen
(74) Attorney, Agent, or Firm—David E. Lovejoy

(57) ABSTRACT

A communication system having a plurality of forward channel communications and a plurality of corresponding reverse channel communications from and to a plurality of mobile users. A plurality of broadcaster transmitters are distributed at macro-diverse locations for transmitting forward channel signals to the users under control of a broadcaster control unit. A plurality of collectors are distributed at macro-diverse locations for receiving reverse channel signals from the users which are processed to yield one or more sequences of data bits as a burst and corresponding initial confidence metrics for each bit. The collectors forward these reverse channel signals including the data bits and corresponding processed confidence metrics to aggregators. The system includes bandwidth control for minimizing backhaul bandwidth from collector to aggregator while maximizing signal quality.

32 Claims, 8 Drawing Sheets

METHOD AND APPARATUS FOR WIRELESS COMMUNICATIONS EMPLOYING CONTROL FOR BROADCAST TRANSMISSION

CROSS REFERENCE

This application is a continuation-in-part of application SC/Ser. No. 08/889,881 filed Jul. 3, 1997 entitled METHOD AND APPARATUS FOR WIRELESS COMMUNICATION EMPLOYING CONTROL FOR CONFIDENCE METRIC BANDWIDTH REDUCTION, assigned to the same assignee as this application.

This application is a continuation-in-part of application SC/Ser. No. 08/889,881 filed on May 30, 1997 entitled METHOD AND APPARATUS FOR WIRELESS COMMUNICATION EMPLOYING CONFIDENCE METRIC PROCESSING FOR BANDWIDTH REDUCTION, assigned to the same assignee as this application.

This application is a continuation-in-part of application SC/Ser. No. 08/801,711 filed Feb. 14, 1997 entitled METHOD AND APPARATUS FOR WIRELESS COMMUNICATION EMPLOYING AGGREGATION FOR DIGITAL SIGNALS, assigned to the same assignee as this application.

BACKGROUND OF THE INVENTION

The present invention relates to the field of two-way wireless communication systems and more specifically to methods and apparatus for communication with mobile telephone users (cellular and personal communication systems), basic exchange telecommunications radio, wireless data communications, two-way paging and other wireless systems.

Conventional Cellular Systems

Present day cellular mobile telephone systems developed due to a large demand for mobile services that could not be satisfied by earlier systems. Cellular systems "reuse " frequency within a group of cells to provide wireless two-way radio frequency (RF) communication to large numbers of users. Each cell covers a small geographic area and collectively a group of adjacent cells covers a larger geographic region. Each cell has a fraction of the total amount of RF spectrum available to support cellular users. Cells are of different sizes (for example, macro-cell or micro-cell) and are generally fixed in capacity. The actual shapes and sizes of cells are complex functions of the terrain, the man-made environment, the quality of communication and the user capacity required. Cells are connected to each other via land lines or microwave links and to the public-switched telephone network (PSTN) through telephone switches that are adapted for mobile communication. The switches provide for the hand-off of users from cell to cell and thus typically from frequency to frequency as mobile users move between cells.

In conventional cellular systems, each cell has a base station with RF transmitters and RF receivers co-sited for transmitting and receiving communications to and from cellular users in the cell. The base station employs forward RF frequency bands (carriers) to transmit forward channel communications to users and employs reverse RF carriers to receive reverse channel communications from users in the cell.

The forward and reverse channel communications use separate frequency bands so that simultaneous transmissions in both directions are possible. This operation is referred to as frequency division duplex (FDD) signaling. In time division duplex (TDD) signaling, the forward and reverse channels take turns using the same frequency band.

The base station in addition to providing RF connectivity to users also provides connectivity to a Mobile Telephone Switching Office (MTSO). In a typical cellular system, one or more MTSO's will be used over the covered region. Each MTSO can service a number of base stations and associated cells in the cellular system and supports switching operations for routing calls between other systems (such as the PSTN) and the cellular system or for routing calls within the cellular system.

Base stations are typically controlled from the MTSO by means of a Base Station Controller (BSC). The BSC assigns RF carriers to support calls, coordinates the handoff of mobile users between base stations, and monitors and reports on the status of base stations. The number of base stations controlled by a single MTSO depends upon the traffic at each base station, the cost of interconnection between the MTSO and the base stations, the topology of the service area and other similar factors.

A handoff between base stations occurs, for example, when a mobile user travels from a first cell to an adjacent second cell. Handoffs also occur to relieve the load on a base station that has exhausted its traffic-carrying capacity or where poor quality communication is occurring. The handoff is a communication transfer for a particular user from the base station for the first cell to the base station for the second cell. During the handoff in conventional cellular systems, there may be a transfer period of time during which the forward and reverse communications to the mobile user are severed with the base station for the first cell and are not established with the second cell.

Conventional cellular implementations employ one of several techniques to reuse RF bandwidth from cell to cell over the cellular domain. The power received from a radio signal diminishes as the distance between transmitter and receiver increases. Conventional frequency reuse techniques rely upon power fading to implement reuse plans. In a frequency division multiple access (FDMA) system, a communications channel consists of an assigned particular frequency and bandwidth (carrier) for continuous transmission. If a carrier is in use in a given cell, it can only be reused in cells sufficiently separated from the given cell so that the reuse site signals do not significantly interfere with the carrier in the given cell. The determination of how far away reuse sites must be and of what constitutes significant interference are implementation-specific details.

TDMA Conventional Cellular Architectures

In TDMA systems, time is divided into time slots of a specified duration. Time slots are grouped into frames, and the homologous time slots in each frame are assigned to the same channel. It is common practice to refer to the set of homologous time slots over all frames as a time slot. Each logical channel is assigned a time slot or slots on a common carrier band. The radio transmissions carrying the communications over each logical channel are thus discontinuous. The radio transmitter is off during the time slots not allocated to it.

Each separate radio transmission, which should occupy a single time slot, is called a burst. Each TDMA implementation defines one or more burst structures. Typically, there are at least two burst structures, namely, a first one for the initial access and synchronization of a user to the system, and a second one for routine communications once a user has been synchronized. Strict timing must be maintained in TDMA systems to prevent the bursts comprising one logical channel from interfering with the bursts comprising other logical channels in the adjacent time slots.

Space Diversity

Space diversity is a method for improving signal quality by the use of multiple spaced-apart transmitting and receiving antennas to send forward channel signals or receive reverse channel signals from a single receiver/transmitter. On the forward link, signals from multiple spaced-apart transmit antennas are received by a single receiver. On the reverse link, multiple spaced-apart receiving antennas receive signals from a single transmitter. Micro-diversity is one form of space diversity that exists when the multiple transmitting or receiving antennas are located in close proximity to each other (within a distance of several meters for example). Micro-diversity is effective against Rayleigh or Rician fading or similar disturbances. The terminology micro-diverse locations means, therefore, the locations of antennas that are close together and that are only separated enough to be effective against Rayleigh or Rician fading or similar disturbances. The signal processing for micro-diverse locations can occur at a single physical location and micro-diversity processing need not adversely impact reverse channel bandwidth requirements. Macro-diversity is another form of space diversity that exists when two or more transmitting or receiving antennas are located far apart from each other (at a distance much greater than several meters, for example, ten kilometers). In macro-diversity systems, on the forward channel the transmitted signals from the multiple transmitter antennas are received by the single receiver and processed to form an improved quality resultant signal at that single receiver. On the reverse channel, the received signals from the single transmitter are processed and combined to form an improved quality resultant signal from that single transmitter. The terminology macro-diversity means that the antennas are far enough apart to have decorrelation at the receivers between the mean signal levels. On the forward channel, the decorrelation is between the mean signal levels for the multiple transmitted signals received by the single receiver. On the reverse channel, the decorrelation is between the mean signal levels for the multiple received signals from the single transmitter. The terminology macro-diverse locations means, therefore, the locations of antennas that are far enough apart to achieve that decorrelation. On the reverse link, since macro-diversity processing involves forwarding of signals to a common processing location, an adverse impact on channel bandwidth tends to result from macro-diversity processing.

Shadow Fading

The decorrelation of mean signal levels employed in macro-diversity systems is due to local variability in the value of signal strength diminution between the single receiver/transmitter and the spaced apart transmitting and receiving antennas. This local variability exists on length scales above Rayleigh or Rician fading and is due to terrain effects, signal blocking by structures or vegetation, and any other variability that exists in a particular environment. This variability is referred to as shadow fading. Decorrelation lengths for shadow fading may be as small as length scales just above Rayleigh fading length scales (fir example, less than a few meters), or may be as large as several kilometers.

Reverse Channel Signal Quality Enhancements

In order for diversity combining to increase the quality of a reverse channel signal, some measure of the quality of the input signals must be generated. One of the difficult problems in designing space-diversity algorithms for the reverse channel is finding an accurate measure of precombination decision reliability, which can be computed in real-time. While the micro-diversity systems improve reverse channel quality by ameliorating the effects of Rayleigh fading, which is short-term in nature, they are not very effective in combating shadow fading. While macro-diversity systems combine received signals from a number of receivers spaced far apart in space to combat shadow fading, in order for macro-diversity to increase the quality of the resulting signal, some measure of the quality of the individual received signals is necessary.

In the above cross-referenced application entitled METHOD AND APPARATUS FOR WIRELESS COMMUNICATION EMPLOYING AGGREGATION FOR DIGITAL SIGNALS, a communication system is disclosed having a plurality of forward channel communications and a plurality of corresponding reverse channel communications from and to a plurality of mobile users. A plurality of collectors is distributed at macro-diverse locations for receiving reverse channel signals from the users. Each of the collectors typically includes micro-diversity receivers for receiving the reverse channel signals from users. The collectors forward these reverse channel signals to the aggregators. The aggregators combine the received signals from the macro-diverse collectors. The combining of multiple collector signals for the same user that are both macro-diverse and micro-diverse results in an output bit stream with fewer bit errors.

In one embodiment of that cross-referenced application, the micro-diverse combining occurs in the collectors and the macro-diverse combining occurs in the aggregators. In an alternative embodiment, some or all of the micro-diverse combining occurs along with the macro-diverse combining in the aggregators.

In the aggregation method of the cross-referenced application, the signals from users received at collector antennas are processed to yield one or more sequences of bits and corresponding one or more confidence metrics for each bit. Inputs from the same user through multiple micro-diverse antennas at each collector are combined to reduce errors resulting from Rayleigh and similar disturbances. Signals from the same user are processed to form sequences of bits and corresponding confidence metric vectors from multiple macro-diverse collectors. These signals are combined in an aggregator to reduce errors resulting from shadow fading and similar disturbances. Increasing the number of confidence metric bits (that is increasing the amount of bandwidth) tends to increase the quality of signals (particularly weak signals) while reducing the bandwidth available for other uses (hence reducing the capacity of the system or the quality of other parts of the system). An appropriate balance between reverse channel bandwidth, aggregated signal quality and system capacity is required. The aggregator processes the data from the multiple collectors and combines and decodes the resulting streams to reduce the probability of bit errors. The combining process utilizes the confidence metrics to make a final decision on each bit. The number of bits of data used in the cross-referenced application can be large and hence there is a need to reduce the amount of data allocated to confidence metrics.

In accordance with the above background, the communications problems resulting from interference, noise, fading and other disturbances create a need for improved wireless communication systems which overcome the interference problems and other limitations of conventional cellular systems.

SUMMARY OF THE INVENTION

The present invention is a communication system having a plurality of forward channel communications and a plurality of corresponding reverse channel communications from and to a plurality of mobile users. A plurality of broadcaster transmitters are distributed at macro-diverse locations for transmitting forward channel signals to the users. A plurality of collectors are distributed at macro-diverse locations for receiving reverse channel signals from the users. The reverse channel signals from users received at collector antennas are processed to yield one or more sequences of data bits as a burst and corresponding initial confidence metrics for each bit where the confidence metrics for the burst form an initial confidence metric vector. Control signals are derived that determine properties of the user transmission channels and are processed to control the forward channels to the users.

In one embodiment, the collectors include bandwidth control to forward the reverse channel signals including the data bits and corresponding processed confidence metrics to aggregators using different bandwidth levels. The higher the signal quality, the lower the bandwidth level and the lower the signal quality, the higher the bandwidth level. The aggregators combine the multiple collector signals for the same user received from the macro-diverse collectors. The combining of multiple collector signals for the same user when the quality of the signals is low results in an output bit stream for the user with fewer bit errors. The aggregator includes central control for commanding bandwidth levels to the collectors based upon information from multiple macro-diverse collectors.

The processing of the initial confidence metrics to form processed confidence metrics is performed with a number of different variations which require different bandwidth levels. The initial confidence metrics in the initial confidence metric vector have an initial range, $a_{in}$, represented by an initial number of bits, $\gamma_{in}$, and are processed to form processed confidence metrics having a processed range, $a_p$, represented by a processed number of bits, $\gamma_p$, and which form the processed confidence metric vector.

In certain embodiments, the number of processed confidence metrics in the processed confidence metic vector are fewer than (and therefore can be sent at a lower bandwidth level) the number of initial confidence metrics in the initial confidence metic vector. The reduction in the number of confidence metrics is achieved by combining two or more initial confidence metrics into a single processed confidence metric and in this manner the total number of bits allocated to the processed confidence metric vector is less than the number of bits in the initial confidence metric vector.

In other embodiments, the processed range, $a_p$, and the processed number of bits, $\gamma_p$, are less than the initial range, $a_{in}$, and the initial number of bits, $\gamma_{in}$, respectively. The reduction in the number of initial confidence metric bits to a fewer number of bits in the processed confidence metrics causes the total number of bits allocated to the processed confidence metric vector to be less than (and therefore can be sent at a lower bandwidth level) the number of bits in the initial confidence metric vector.

In other embodiments, both the number of confidence metrics and the number of bits per confidence metric are reduced to cause the total number of bits allocated to the processed confidence metric vector to be less than (and therefore can be sent at a lower bandwidth level) the number of bits in the initial confidence metric vector.

The present invention employs static and dynamic control of channel bandwidth at local and centralized sites. The bandwidth level is increased to improve the quality of poor signals and is decreased when signal quality is good to enable the unused bandwidth to be used by other resources.

The present invention employs quality measurements reported on the reverse link to control and optimally select or combine broadcast transmissions from one or more macro-diverse broadcaster transmitters to improve the quality of forward channel transmissions.

In another embodiment, additional control information for selecting or combining broadcast transmissions may be provided by history databases of network performance.

The foregoing and other objects, features and advantages of the invention will be apparent from the following detailed description in conjunction with the drawings.

DETAILED DESCRIPTION

Figure 1:
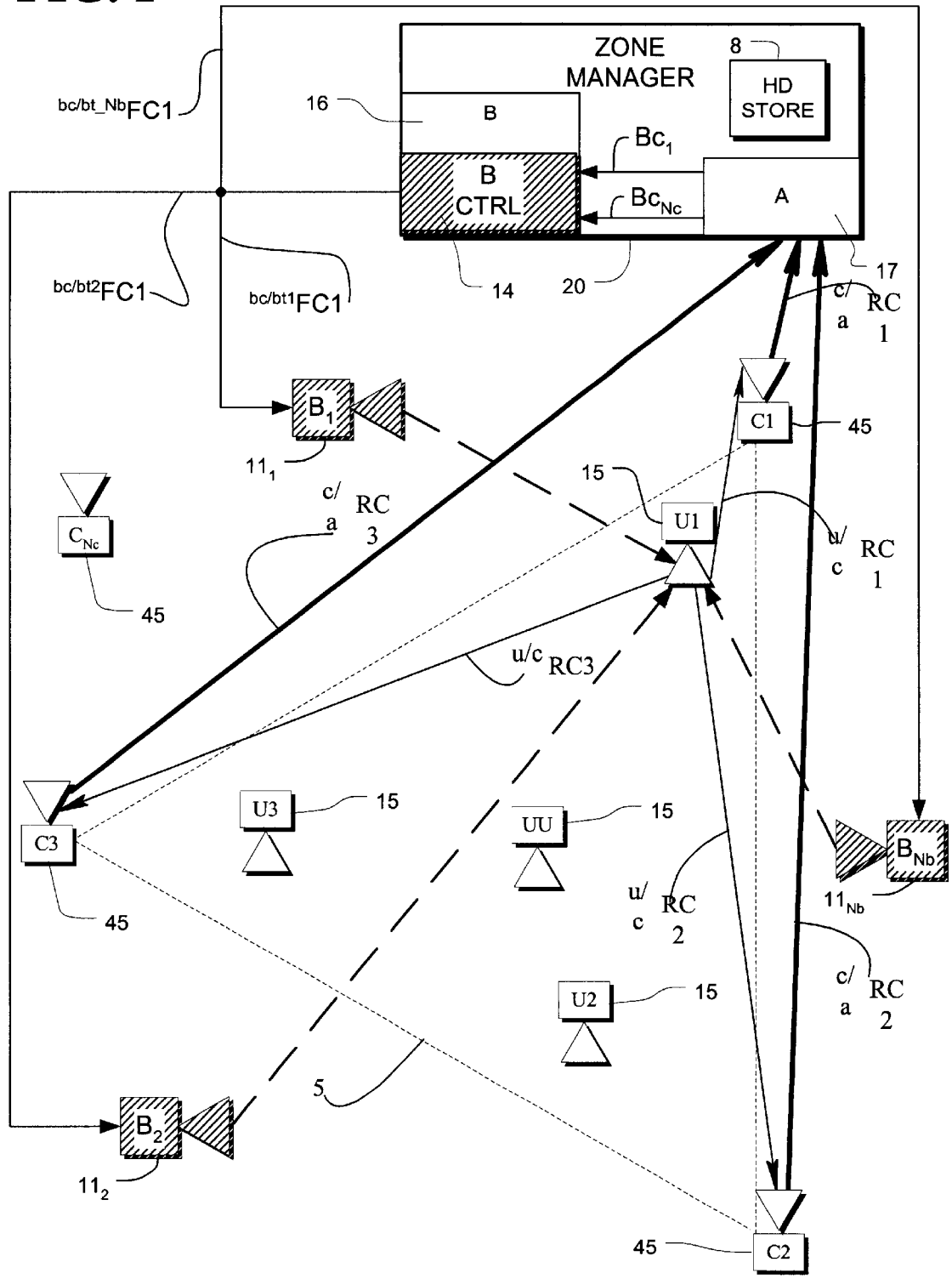
FIG. 1 depicts a communication system for wireless users employing macro-diversity combining, each user receiving forward channel signals from a plurality of broadcaster transmitters and transmitting user reverse channel signals to a plurality of collectors that in turn forward the user signals with processed confidence metrics for each user to an aggregator for combining.

Cellular System—FIG. 1

In FIG. 1, a cellular system is shown having a zone manager 20 that broadcasts forward channel (FC) communications from broadcaster 16 to multiple users 15 including users U1, U2, . . . , UU located within a zone 5 designated by the dashed-line triangle. The broadcaster 16, in the embodiment described, is distributed to include distributed broadcaster transmitters $11_1$, $11_2$, . . . , $11_{Nb}$ and a broadcaster control 14. The broadcaster transmitters $11_1$, $11_2$, . . . , $11_{Nb}$ are sited at macro-diverse locations relative to each other within zone 5. One or more of the broadcaster transmitters $11_1$, $11_2$, . . . , $11_{Nb}$ broadcasts in a forward channel (FC) to each of the users 15. The broadcaster control 14 includes a broadcaster signal processor receiving control signals and operating to control the signals that are broadcast on each of the broadcaster transmitters $11_1$, $11_2$, . . . , $11_{Nb}$. The control signals in one embodiment are $Bc_1$, . . . , $Bc_{Nc}$ and are derived from the reverse channel signals from the C1, C2, C3, . . . , $C_{Nc}$ collectors 45 of FIG. 1. Each of the multiple users 15 transmits reverse channel (RC) communications to one or more of multiple collectors 45 including collectors C1, C2 and C3, which in turn forward the reverse channel communications to aggregator 17 in zone manager 20. The aggregator 17 in turn provides the control signals $Bc_1, \ldots, Bc_{N_c}$ to the broadcaster control 14 for signal processing to assist the broadcaster control 14 to select and control the forward channel signals.

Each of the users 15 has a receiver antenna for receiving broadcasts on the forward channel from one or more of the broadcaster transmitters $11_1, 11_2, \ldots, 11_{Nb}$ of the broadcaster 16. Also, each of the users 15 has a transmitter that transmits on a reverse channel to the collectors 45. The collectors 45 are sited at macro-diverse locations relative to each other within zone 5. Therefore, multiple copies of macro-diverse reverse channel communications are received at the aggregator 17 for each user.

In FIG. 1, the U1 user 15 is typical with forward channel (FC) communications ($^{bc/bt}$FC) from the broadcaster control 14 to each of the broadcaster transmitters $11_1, 11_2, \ldots, 11_{Nb}$, and forward channel communications ($^{bt/u}$FC) from each of the broadcaster transmitters $11_1, 11_2, \ldots, 11_{Nb}$ to user U1. The forward channel communications to the U1 user 15 include the broadcaster control-to-broadcaster transmitter communication $^{bc/bt}$FC1, the broadcaster control-to-broadcaster transmitter communication $^{bc/bt}$FC2, the broadcaster control-to-broadcaster transmitter communication $^{bc/bt}$FCNb, the broadcaster transmitter-to-user communication $^{bt/u}$FC1, the broadcaster transmitter-to-user communication $^{bt/u}$FC2, and the broadcaster transmitter-to-user communication $^{bt/u}$FCNb. The user U1 has user-to-collector reverse channel communications ($^{u/c}$RC) to each of the C1, C2 and C3 collectors 45, and the collector-to-aggregator reverse channel communications ($^{c/a}$RC) for each of the collectors to aggregator 17. The reverse channel communications from the U1 user 15 include the user-to-collector communication $^{u/c}$RC1 and the collector-to-aggregator communication $^{c/a}$RC1, the user-to-collector communication $^{u/c}$RC2 and the collector-to-aggregator communication $^{c/a}$RC2 and the user-to-collector communication $^{u/c}$RC3 and the collector-to-aggregator communication $^{c/a}$RC3. Each of the other users U2, . . . , UU in FIG. 1 has similar forward and reverse channel communications.

The forward and reverse channel communications of FIG. 1 in the present invention apply to any digital radio signal system including for example TDMA, CDMA, SDMA and FDMA systems. If the digital radio signals of any particular system are not inherently burst structured, then arbitrary burst partitions may be used for confidence metric processing.

The broadcast controller 14 receives HD signals from the zone manager history database (HD) 8 for use in choosing the set of broadcaster transmitter power levels, timing offsets, and other control information used in connection with transmitting traffic data to each user 15. In one embodiment, the HD signals include data for determining the location of the user 15 based on the set of received signal strengths and timing offsets at each of Nc collectors 45 and data for determining the transmission path loss from each broadcaster transmitter 11 to the user 15 based on the measurements of receive signal strength and quality forwarded by the user 15 in reverse channel (RC) transmissions. The type of measurements are specific to the multiple access scheme employed.

In a further embodiment, the zone manager 20 performs the processing to determine the user 15 location and transmission path losses and the zone manager 20 forwards this information to the broadcast controller 14. In a still further embodiment, both a region manager 12 (not shown, see FIG. 10) and zone manager 20 send history database information to the broadcast controller 14, including the current transmit power and timing settings from other broadcast controllers across the network.

The control information used by the broadcaster controller 14 to control the downlink transmissions to users 15 includes the radio channel conditions and the locations of users 15. Radio channel control information includes error rates, received power levels, fading profiles and multipath conditions. The control information is used by the broadcaster controller 14 in determining which macro-diverse transmitters 11 should be used for downlink transmissions and the corresponding power levels. The mobile user location, derived from uplink time of arrival information, not only provides antenna proximity information but it also helps to synchronize the downlink transmissions. In this respect the user location provides both time and power information for the downlink.

In a still other embodiment, network state information is used to optimize broadcast transmissions on a network-wide or regional basis. The network state information accounts for activity in other parts of the system which can be degraded by macro-diverse transmissions from broadcasters in the absence of proper accounting for macro-diverse transmissions. This network state information is primarily directed at minimizing the amount of interference generated while providing enough transmit power such that an acceptable downlink performance is achieved.

The broadcaster controller 14 uses the control information to determine which downlink transmitters 11 will be used and determines the appropriate signal conditioning, including power control, transmit offset timing, carrier phase and frequency, modulation and coding, to be used in the down link transmissions. This information is then sent to the appropriate broadcaster transmitters 11 along with the traffic data to be transmitted.

The data sent to the broadcaster transmitters is a function of several factors including the bandwidth and processing capabilities that can be employed. In order to lower the required bandwidth, more processing power and complexity is made available to the broadcaster transmitters 11. If a higher bandwidth is allowed, then lower processing power and complexity is made available to the broadcaster transmitters 11. In a simple case, the broadcaster transmitters are transmit schedulers that receive data from the broadcaster controller 14 and transmit the data with the appropriate conditioning.

In one embodiment, the macro-diverse transmissions from multiple broadcaster transmitters 11 are received and combined by the users 15 and each user 15 processes each individual transmission as if it were a multipath component from a single broadcaster transmitter 11. In another embodiment, specialized coding, modulation, or carrier transmission schemes are used to send distinguishable transmissions from each macro-diverse transmitter 11 to users 15. In this embodiment, each user 15 separately processes each of the multiple transmissions from multiple transmitters 11 prior to the combining of the traffic data from the multiple transmitters 11.

The broadcast controller 14 receives forward channel transmit bits Tb for each user 15 from the zone manager 20 and forwards these data to one or more broadcaster transmitters 11 for transmission to the user 15. In one embodiment, the $^{bc/bt}$FC signals between the broadcast controller 14 and the broadcaster transmitters 11 includes only the raw traffic bits along with power control and timing offsets, and the broadcaster transmitters 11 perform all bit manipulations for interleaving packetizing, or other processing defined with the multiple access protocol in use within the network, perform RF signal processing to modulate the radio signals $^{bt/u}$FC, and then transmit the signals at the commanded power levels and with the commanded timing offsets. In another embodiment, the bit manipulations are performed at the broadcast controller 14, and the broadcaster transmitters 11 perform the RF signal processing and transmit the $^{bt/u}$FC signals. In yet another embodiment, all bit manipulations and RF signal processing is performed at the broadcast controller, and the broadcaster transmitters are responsible only for broadcasting the $^{bt/u}$FC signals with the correct power levels and timing offset.

The $^{bc/br}$FC signals from the broadcast controller 14 to the broadcaster transmitters 11 also include the transmit control and channel information TCCI, transmit timing and synchronization TTS, and transmit power control TPC signaling. The TCCI signals contain information specifying the broadcast channel in terms of the particular multiple access scheme in use, and also operations, administration, maintenance, and provisioning (OAM&P) data on the specific resources, such as antennas, processors, and data links, to be used in transmitting the traffic. The data specifying the broadcast channel can include, for example, RF frequency, timeslot and logical channel type, and frequency hopping pattern. The TTS signals contain transmission time offsets for each separate broadcaster transmitter, time stamps or other data to synchronize the transmissions of the individual broadcaster transmitters 11, and time marks for the adjustment of power control, carrier phase, or carrier frequency. The TPC signals set transmit power levels for the broadcaster transmitters. The time scale for power level changes may be as short as allowable under the RF transmission technology employed by the particular multiple access scheme in use.

Figure 2:
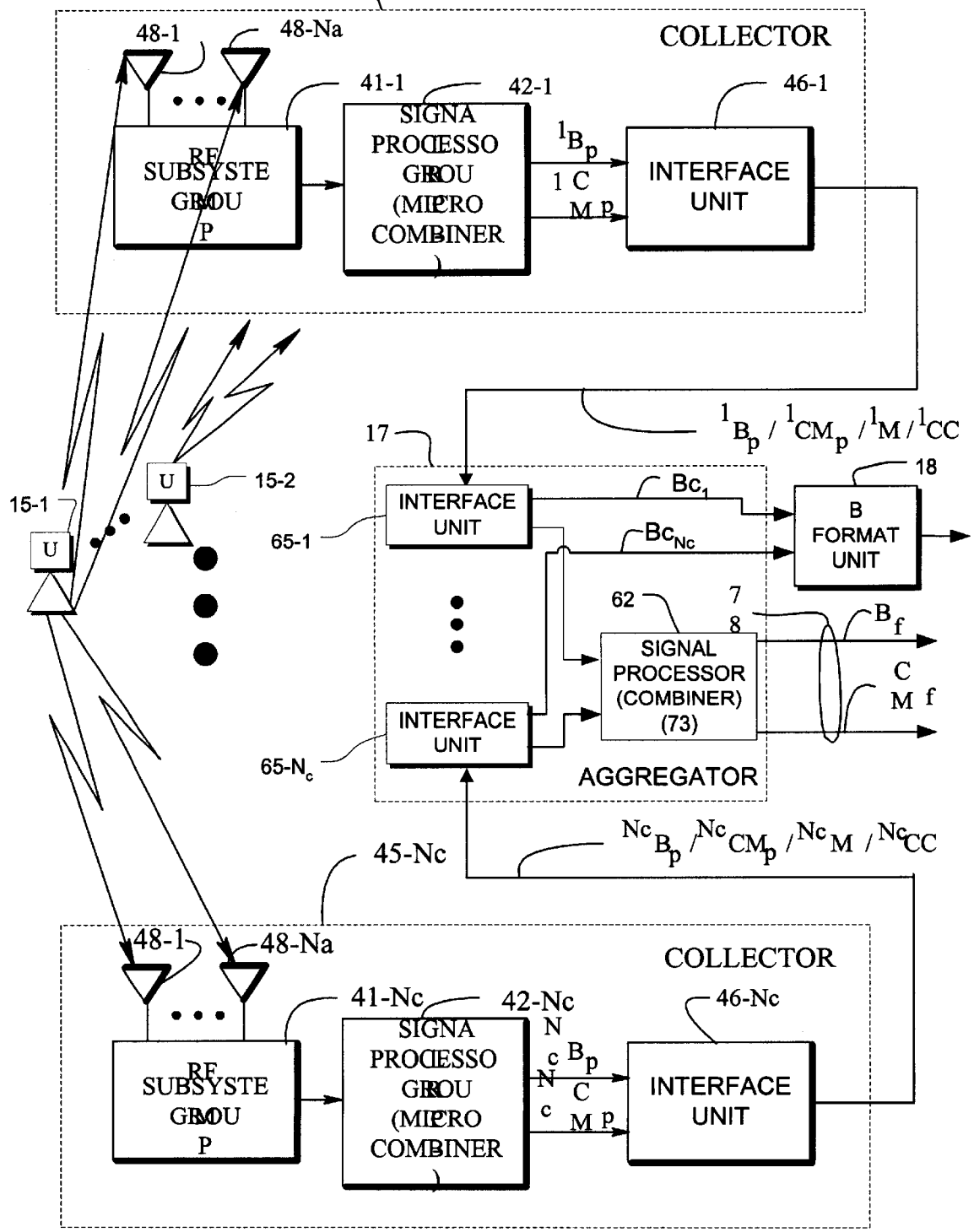
FIG. 2 depicts further details of the users, plurality of collectors and aggregator for the communication system of FIG. 1.

Multiple-Collector Configuration—FIG. 2

In FIG. 2, a plurality of collectors 45-1, . . . , 45-Nc, like the collectors 45 in FIG. 1, each receive reverse channel communications from users 15-1, . . . , 15-U. For each user 15, the collectors 45-1, . . . , 45-Nc each process the received signals with initial confidence metrics to generate data bursts, $^1B_p$, . . . , $^{Nc}B_p$, respectively, and corresponding processed confidence metric vectors $^1CM_p$, . . . , $^{Nc}CM_p$, respectively, all representing the same communication from the user 15. These communications have macro-diversity because of the macro distances separating the collectors 45 of FIG. 1. These communications include spatially macro-diverse data bursts, $^1B_p$, . . . , $^{Nc}B_p$, and corresponding processed confidence metric vectors $^1CM_p$, . . . , $^{Nc}CM_p$ that are forwarded to the aggregator 17 in formatted form designated as $^1B_p/^1CM_p/^1M/^1CC, \ldots, ^{Nc}B_p/^{Nc}CM_p/^{Nc}M/^{Nc}CC$. The aggregator 17 receives the signals $^1B_p/^1CM_p/^1M/_1CC, \ldots, ^{Nc}B_p/^{Nc}CM_p/^{Nc}M/^{Nc}CC$ in terface units 65-1, . . . , 65-Nc, respectfully, and forwards those signals to the signal processor 62 for combining and forms the control signals $Bc_1$, . . . , $Bc_{Nc}$ for forwarding to the broadcaster control 14 of FIG. 1.

The signal processor 62 in the aggregator 17 combines the spatially diverse data bursts $^1B_p, \ldots, ^{Nc}B_p$, and corresponding confidence metric vectors $^1CM_p, \ldots, ^{Nc}CM_p$ to form a final single representation of the data burst, $B_f$, with a corresponding final confidence metric vector, $CM_f$. The aggregator 17 may use the measurement signals $^1M$, . . . , $^{Nc}M$ and control signals $^1CC$, . . . $^{Nc}CC$ in selecting or processing the data bursts $^1B_p$, . . . , $^{Nc}B_p$, and/or the corresponding confidence metric vectors $^1CM_p, \ldots, ^{Nc}CM_p$.

For example, if a particular burst is associated with a poor quality signal, the particular burst may be excluded from the aggregation. The quality of a signal is measured in one example based on the channel model attenuation estimate.

In FIG. 2, the collectors 45-1, . . . , 45-Nc include an RF subsystem groups 41-1, . . . , 41-Nc which have two or more micro-diversity receive antennas 48-1, . . . , 48-$N_a$. The antennas 48-1, . . . , 48-$N_a$ each receives the transmitted signals from each one of a plurality of users 15-1, . . . , 15-U. Each representation of a received signal from a single user that is received by the RF subsystem group 41-1, . . . , 41-Nc connects in the form of a burst of data to the corresponding signal processor group 42-1, . . . , 42-Nc. The received data bursts from the antennas 48-1, . . . , 48-$N_a$ are represented as $^1B_r, \ldots, ^{Na}B_r$. The signal processor groups 42-1, . . . , 42-Nc processes the plurality of received bursts for a single user to form a single processed bursts, $^1B_p, \ldots, ^{Nc}B_p$, representing the signals from the single user. The processed bursts, $^1B_p, \ldots, ^{Nc}B_p$, have corresponding confidence metric vectors, $^1CM_p, ^2CM_p, \ldots, ^{Nc}CM_p$, representing the reliability of each bit of the data bursts. Each processed burst has the bits $\beta_{p1}, \beta_{p2}, \ldots, \beta_{pB}$ and the processed confidence metric vector, $CM_p$, has the corresponding processed confidence metrics $cm_{p1}, cm_{p2}, \ldots, cm_{pB}$. Measurement signals, $^1M, \ldots, ^{Nc}M$, are formed that measure the power or other characteristics of the signal. The processed bursts, the confidence metric vectors, and the measurements connect to the interface units 46-1, . . . , 46-Nc which format those signals and transmit or otherwise connect them as reverse channel signals to the aggregator 17.

In FIG. 2, the signal processor groups 42-1, . . . , 42-Nc receive timing information that permits collector signals from each collector to be time synchronized with signals from each of the other collectors. For example, each collector has a global positioning system (GPS) receiver (not shown) for receiving a time synchronization signal. Alternatively, or in addition, the zone manager 20 of FIG. 1 can broadcast or otherwise transmit time synchronization information. The signal processors 42-1, . . . , 42-Nc provide time stamps in collector control signals $^1CC, \ldots, ^{Nc}CC$ that are forwarded from interface units 46-1, . . . , 46-Nc as part of the reverse channel signals to the aggregator 17.

In FIG. 2, each interface unit 65 forwards measurement signals M and control signals CC to the data formatter 18 for formatting and forwarding to the broadcast control 14 of FIG. 1. In one embodiment, the signal processor 62 also forwards measurements derived from the processed bits and confidence metrics for each collector to the broadcast control data formatter 18 for forwarding to the broadcast control 14 of FIG. 1. In another embodiment, the processed reverse channel bits Bp and confidence metrics CMp from each collector are forwarded to the broadcast control data formatter 18 directly from the interface units 65, relieving the processing load on the signal processor 62 and hence that processing is performed by the broadcast controller 14.

The broadcast control data formatter 18 combines the data from the interface units 65 and the signal processor 62 into a composite signal Bc for each collector, specifically signals Bc1, . . . , BcNc, and forwards these signals to the broadcast controller 14.

Figure 3:
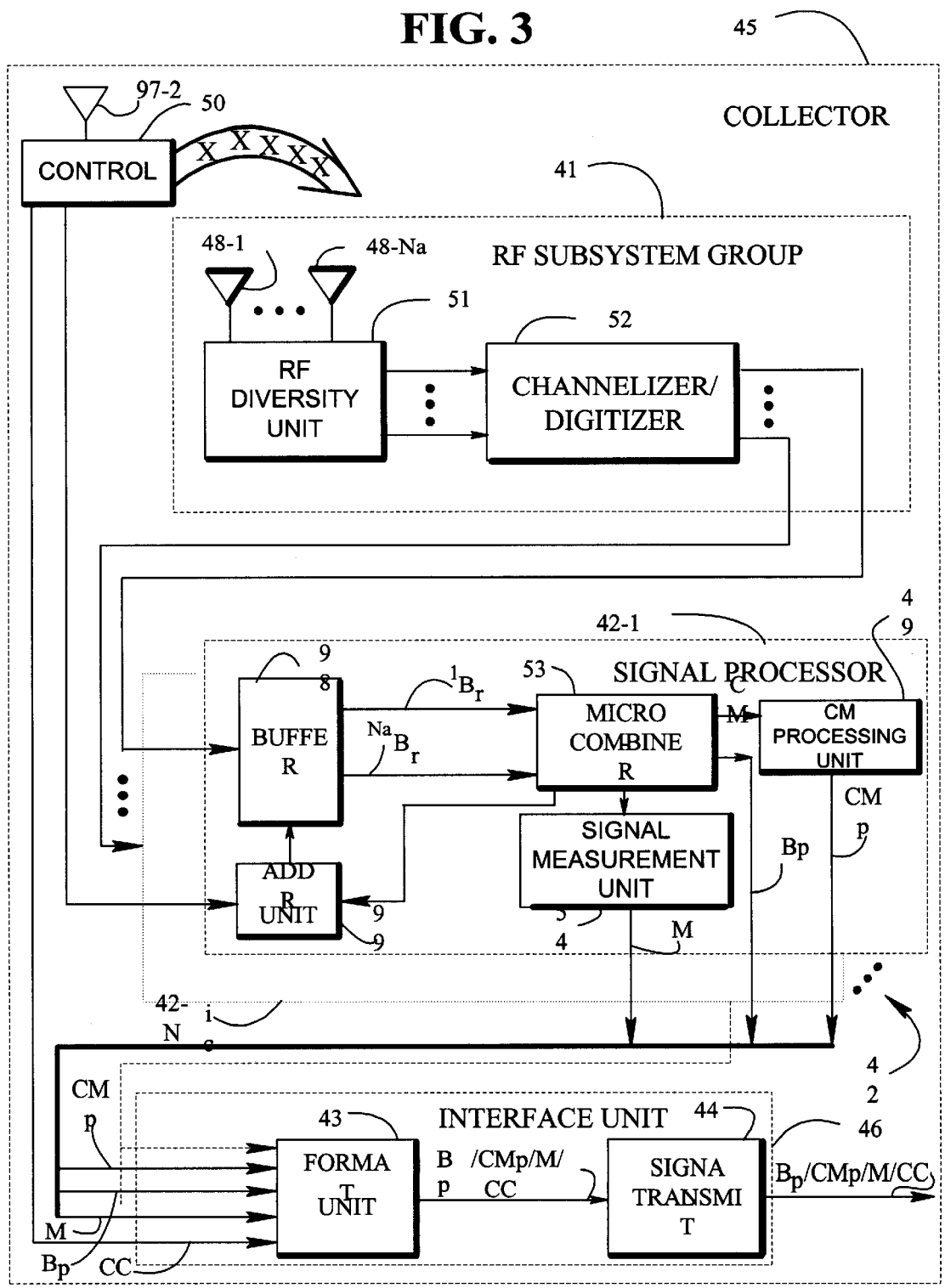
FIG. 3 depicts a block diagram representation of a collector.

Collector—FIG. 3

In FIG. 3, a collector 45 is typical of each of the collectors 45 of FIG. 1 and FIG. 2. In FIG. 3, the collector 45 includes an RF subsystem group 41 which has two or more micro-diversity receive antennas 48-1, . . . , 48-$N_a$. The antennas 48-1, . . . , 48-$N_a$ each receives the transmitted signals from each one of a plurality of users. Each representation of a received signal from a single user that is received by the RF subsystem group 41 connects in the form of a burst of data to the signal processor group 42. The received bursts of data from the antennas 48-1, . . . , 48-$N_a$ are represented as $^1B_r, \ldots, ^{Na}B_r$, respectively, in FIG. 3. The signal processor group 42 processes the plurality of received bursts for a single user to form a single processed burst, $B_p$, representing the signals from the single user. The processed burst, $B_p$, has a confidence metric vector, CM, representing the reliability of each bit of the data comprising the processed burst, $B_p$. Each processed burst has the bits $\beta_{p1}, \beta_{p2}, \ldots, \beta_{pB}$ and the confidence metric vector, CM, has the corresponding confidence metrics $cm_1, cm_2, \ldots, cm_B$. Measurement signals, M, are formed that measure the power or other characteristics of the signal, and control signals, CC, are generated to control the operations. The processed burst, $B_p$, the confidence metric vector, $CM_p$, the measurements, M, and the control, CC, connect to the interface unit 46 which formats those signals and transmits or otherwise connects them as reverse channel signals to the aggregator 17 of zone manager 20 of FIG. 1.

In FIG. 3, the signal processor group 42 receives timing information that permits collector signals from each collector to be time synchronized with signals from each of the other collectors. For example, each collector has a global positioning system (GPS) receiver (not shown) for receiving a time synchronization signal. Alternatively, or in addition, the zone manager 20 or some region manager (not shown) of FIG. 1 can broadcast or otherwise transmit time synchronization information. The time stamp is provided in the control code (CC) signal that is forwarded from interface unit 46 to the aggregator 17 of FIG. 2.

In FIG. 3, the RF subsystem group 41 includes an RF diversity unit 51 that receives signals from users 15 on micro-diversity antennas 48-1, . . . , 48-$N_a$ and connects to a channelizer/digitizer 52. The channelizer isolates signals on individual carriers for processing with an output for each of the carriers $N_1, \ldots, N_{ic}$. The digital signals from the channelizer/digitizer 52 for one carrier are input to the signal processor group 42-1 and specifically to a buffer 98. The address unit 99 selects from buffer 98 bursts that correspond to individual users for processing by micro-combiner 53. The micro-combiner 53 outputs processed data bit values in processed burst, $B_p$, and associated confidence metric values in confidence metric vector, $CM_p$. The data and metric values from signal processor 42-1 are connected directly to the format unit 43 in interface unit 46.

In FIG. 3, a plurality of signal processors 42-1, . . . , 42-$N_{ic}$ form a signal processor group 42 with one processor for each channel signal from the channelizer/digitizer 52. Each signal processor is like processor 42-1 and provides inputs to interface unit 46. The digital signals from the channelizer/digitizer 52 for a carrier are input to one of the signal processors 42-1, . . . , 42-$N_{ic}$ and a corresponding buffer like buffer 98 in signal processor 42-1. The data and metric values from signal processors 42-1, . . . , 42-Nic are all connected directly to the format unit 43 in interface unit 46 for forwarding to an aggregator.

In FIG. 3, the control 50 performs control functions associated with the other units of the collector and in particular, receives the time synchronization signal through antenna 97-2 from some timing source. The control 50 generates a time stamp that is inserted at times into the control code (CC) field by the interface unit 46 so that each one or more bursts has a time stamp in a collector that is used at the aggregator to time correlate the same bursts from the same user that are processed at different collectors.

In FIG. 3, the address unit 99 controls the writing of the signals into buffer 98 and the reading of the signals from buffer 98. The address unit 99 is synchronized by coarse timing information from control 50 and by fine timing information from micro-combiner 53.

Further, a signal measurement unit 54 receives signals from the combiner 53 to form power or other measurements on the received bursts or on the processed signals from the combiner 53 to form a measurement signal, M, that inputs to interface unit 46.

The format unit 43 changes the format of the data and metric values from the signal processor group 42 to form signal, $B_p/CM_p/M/CC$, and the format unit 43 connects to the signal transmit unit 44. The transmit unit 44 of collector 45 transmits or otherwise connects the reverse channel user information, $B_p/CM_pM/CC$, to the aggregator 17. The transmission medium between the collector 45 and the aggregator 17 can be land lines, such as wire or optical fiber, or can be RF transmission using either in-band or out-of-band RF transmission signals. If the collector 45 is located at the aggregator 17, then a local bus or other direct connection not requiring transmission is employed.

In FIG. 3, the micro-combiner 53 operates with each of the received data bursts $^1B_r, \ldots, ^{Na}B_r$ to form the processed data burst, $B_p$, and a corresponding confidence metric vector, CM. The combining of confidence metrics from micro-diverse antennas at a collector to produce processed bits of a processed data burst, $B_p$, and corresponding confidence metrics may be accomplished in one embodiment by an integrated multisensor equalization process. In another embodiment, the signals from separate antennas may be equalized individually and then combined by averaging or other processing of the equalizer confidence metrics.

The processed data burst, $B_p$, includes the processed burst bit values $\beta_{p1}, \beta_{p2}, \ldots, \beta_{pB}$ and the resultant confidence metric vector, CM, includes the corresponding confidence metrics $cm_1, cm_2, \ldots cm_B$ where B in the subscript is the number of bits in the burst and the number of corresponding confidence metrics, one confidence metric for each bit.

The confidence metric, $cm_b$, is in the form of a number. A large positive confidence metric value indicates a high confidence that the data bit is a binary 1. A large negative confidence metric value indicates a high confidence that the data bit is a binary 0.

Figure 4:
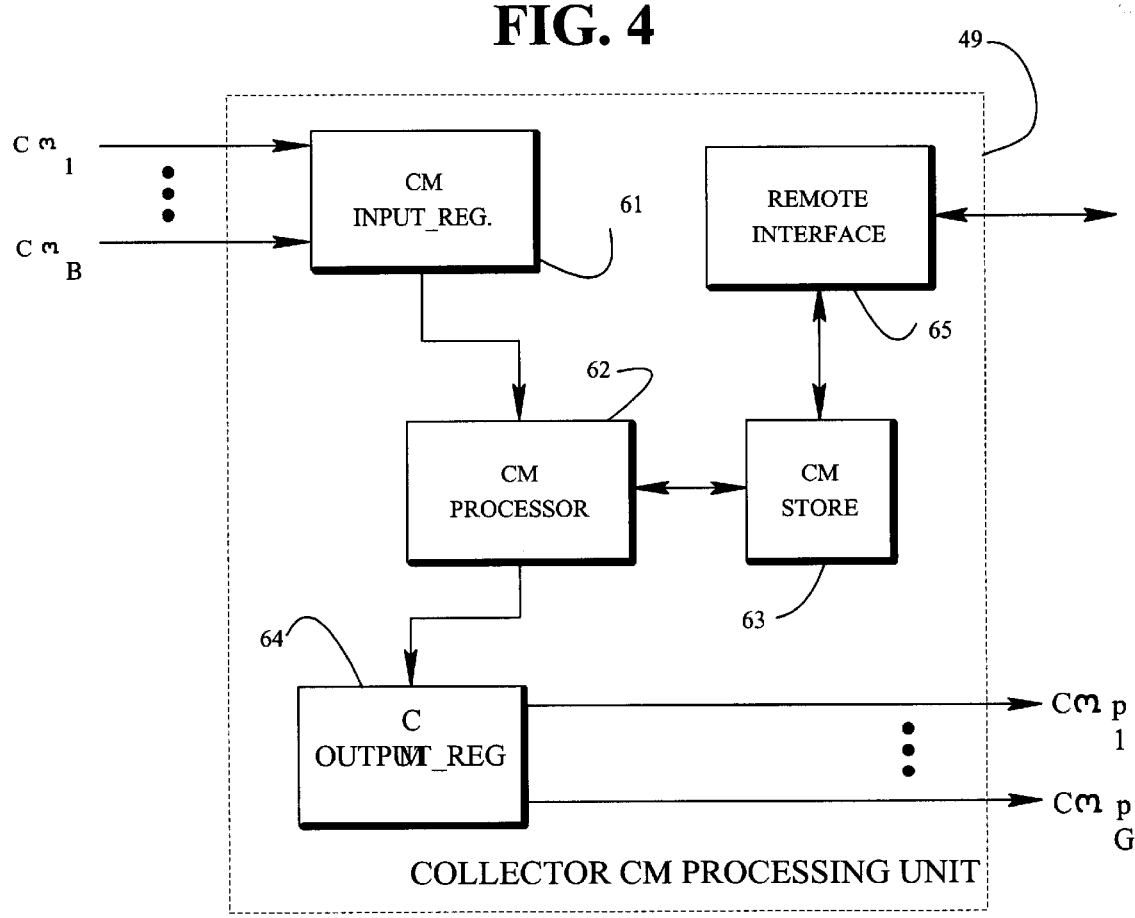
FIG. 4 depicts a block diagram representation of a collector processing unit for processing of confidence metrics.
Figure 5:
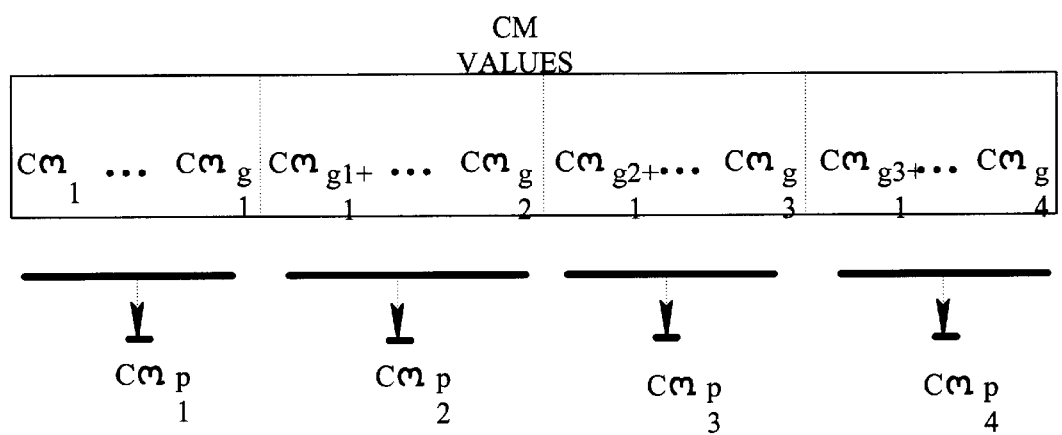
FIG. 5 depicts a block diagram representation of compression of confidence metrics.

Collector Confidence Metric Processing Unit—FIG. 4 And FIG. 5

In FIG. 4, the Collector Confidence Metric Processing unit 49 of FIG. 3 is shown in further detail. The confidence metric vectors for a series of bursts are input one at a time to the CM input register 61. Each confidence metric vector, CM, includes the confidence metrics $cm_1, cm_2, \ldots, cm_b, \ldots, cm_B$, one for each of the B data bits, $\beta_{p1}, \beta_{p2}, \ldots, \beta_{pb}, \ldots, \beta_{pB}$, in a data burst.

Each of the confidence metrics such as typical confidence metric, $cm_b$, corresponding to a data bit, $\beta_{pb}$, is in the form of an signed number, $s_b c_b$, where $s_b$ is the sign having a −1 or +1 value and $c_b$ is the amplitude where $0 < c_b < \alpha$ and the amplitude $\alpha$ indicates the range for $c_b$. Therefore, each confidence metric, $cm_b$, is represented by a signed number value, $s_b c_b$, where $(-\alpha) < s_b c_b < (+\alpha)$. For $\gamma$ equal to the number of bits in the amplitude of the confidence metric, $\alpha = 2^\gamma$. A large positive confidence metric value, $+c_b$, indicates a high confidence that $cm_b$ is a binary 1. A large negative confidence value for $-c_b$ indicates a high confidence that $cm_b$ is a binary 0. More generally, the confidence metrics $cm_1, cm_2, \ldots, cm_b, cm_B$ are represented by the signed numbers $s_1c_1, s_2c_2, \ldots, s_bc_b, \ldots, s_Bc_B$ for the B bits in a data burst.

In one embodiment described, the logical 1 and logical 0 values of the data bits, $\beta_{p1}, \beta_{p2}, \ldots, \beta_{pb}, \ldots, \beta_{pB}$, in a data burst represent the signs $s_1, s_2, \ldots, s_b, \ldots, s_B$ where a 1 for a data bit is positive and a 0 for a data bit is negative. Only the data bits, $\beta_{p1}, \beta_{p2}, \ldots, \beta_{pb}, \ldots, \beta_{pB}$ and confidence metrics are actually transmitted from the collectors to the aggregator. At the aggregator, the data bits, $\beta_{p1}, \beta_{p2}, \ldots, \beta_{pb}, \ldots, \beta_{pB}$ are mapped to the signs $s_1, s_2, \ldots, s_b, \ldots, s_B$ where a 1 for a data bit is a positive sign and a 0 for a data bit is a negative sign as follows:

$$\beta=0 \rightarrow s_b=-1$$
$$\beta=1 \rightarrow s_b=+1 \qquad \text{Eq. (1)}$$

In FIG. 4, the CM processor 62 operates with a number of different algorithms to process the initial confidence metrics to form processed confidence metrics. For example, the processing includes grouping of confidence metrics, scaling and quantizing of confidence metrics together with static and dynamic control of the processing.

In FIG. 4, the CM processor 62 in one grouping embodiment processes the confidence metrics in groups and, for each group, provides one or more processed confidence metrics. The initial confidence metrics, $CM_1, CM_2, \ldots, CM_b, \ldots, CM_B$ for one data burst are divided into G groups that include the groups G1, G2, ..., GG that in turn include the confidence metrics $CM_1, \ldots, CM_{g1}$ for group G1; $CM_{(g1+1)}, \ldots, CM_{g2}, \ldots, CM_{(gG-1)+1}, \ldots, CM_{gG}$ for group GG. Each of the confidence metrics in the first group, $CM_1, \ldots, CM_{g1}$, is combined to form a single processed confidence metrics $CM_{p1}$. Similarly, the other groups are processed to form the processed confidence metrics $CM_{p1}$, $CM_{p2}, \ldots, CM_{pi}, \ldots, CM_{pg}$.

By way of example, and referring to FIG. 5, the confidence metrics $CM_1, CM_2, \ldots, CM_b, \ldots, CM_B$ for one burst are divided into four groups. The four groups G1, G2, G3 and G4 include the confidence metrics $CM_1, \ldots, CM_{g1}$ for group G1; $CM_{(g1+1)}, \ldots, CM_{g2}$; for group G2; $CM_{(g2+1)} \ldots, CM_{g3}$ for group G3; and $CM_{(g3+1)}, \ldots, CM_{g4}$ for group G4. Each of the confidence metrics in the first group, $CM_1, \ldots, CM_{g1}$, is combined to form a single processed confidence metric $CM_{p1}$. Similarly, the four groups are processed to form the four processed confidence metrics $CM_{p1}, CM_{p2}, CM_{p3}, CM_{p4}$. The processing for each group is achieved in one embodiment by averaging the confidence metrics in a group.

$$CM_x = \frac{\sum_{k=g(i)+1}^{k=g(i+1)} CM_k}{g(i+1)-g(i)} \qquad \text{Eq. (2)}$$

The processed confidence metric for the $i^{th}$ group, $CM_{pi}$, is given by the average as follows:

where,
$CM_k = k^{th}$ initial confidence metric
$CM_{pi}$ = processed confidence metric for the $i^{th}$ group
$g(i)+1$ = beginning confidence metric in group
$g(i+1)$ = ending confidence metric in group
$g(i+1)-g(i)$ = number of confidence metrics in group By way of example and referring to FIG. 5 for group G1 with g(1) equal to 4, Eq. (2) becomes:

$$CM_{p1} = \frac{CM_1 + CM_2 + CM_3 + CM_4}{4} \qquad \text{Eq. (3)}$$

In the four-group example described, the processing of four groups causes four processed confidence metrics to replace all (for example, 116 in a GSM embodiment) of the initial confidence metrics. In FIG. 4, the input to register 61 is the initial confidence metric $CM_1, CM_2, \ldots, CM_b, \ldots, CM_B$ and the output, after processing in the collector CM processor 62, is the processed confidence metrics $CM_{p1}, CM_{p2}, \ldots, CM_{pG}$ stored in the CM output register 64. In the example where the number of groups, G, is four, the four processed confidence metrics are $CM_{p1}, CM_{p2}, CM_{p3}$ and $CM_{p4}$.

Other grouping embodiments process confidence metrics byusing a median confidence metric or some $N^{th}$ percentile confidence metric to represent two or more of the initial confidence metrics. The combining of groups of confidence metrics substantially reduces the amount of data required to represent confidence metrics and hence reduces the amount of reverse channel information which is propagated and thereby conserves reverse channel bandwidth.

In FIG. 4, the CM store 63 stores control code and information for the algorithms used to combine the confidence metrics from the input register 61 to form the processed confidence metrics in the output register 64. In one example described, store 63 determines that the input metrics will be divided into four groups and causes each group to be averaged to form one processed confidence metric per group. Other control algorithms are stored in the CM store 63. For example, the number of confidence metrics in each group, the group boundaries (overlapping or non-overlapping) and the number of bits per processed confidence metric can be selected. The combining process is controllable to use algorithms other than averaging (for example using a median confidence metric or some $N_{th}$ percentile confidence metric) and the combining process is controllable to apply one algorithm at one time and another algorithm at another time. The store 63 is static in one embodiment and in other embodiments is modified from time to time with information over the remote interface 65.

In some embodiments of the present invention, the confidence metrics are scaled and quantized so that each one can be represented by a small number of bits, typically 2 to 4, to conserve transmission bandwidth. Such quantization of the initial confidence metrics tends to have only a minimal adverse impact on the final signals output from the aggregator 17 of FIG. 2 if three or more bits are used. By way of comparison, grouping of initial confidence metrics into grouped confidence metrics tends to have a greater adverse impact on the final signals output from the aggregator 17 of FIG. 2 when the group sizes are one-half or one-quarter of the total number of initial confidence metrics.

A simple quantization scheme is linear quantization, where the range of confidence metrics is divided into $2^\gamma$ equal-sized bins, and values in each bin are represented by a $\gamma$-bit value. In FIG. 4, each of the initial confidence metrics, $CM_1, CM_2, \ldots, CM_i, \ldots, CM_B$ has an initial range, $a_{in}$, represented by an initial number of metric bits, $\gamma_{in}$, and the collector confidence metric processing unit processes the initial confidence metrics to form processed confidence metrics, $CM_{p1}, CM_{p2}, \ldots, CM_{pG}$, each having a processed range, $a_p$, represented by a processed number of metric bits, $\gamma_p$, where the processed number of metric bits, $\gamma_p$ is typically less than the initial number of metric bits, $\gamma_{in}$.

Assuming that confidence metrics are processed in unsigned form (since the sign information is present in the corresponding data bit values that are also transmitted to the aggregator) the following formula can be used to perform linear quantization of the confidence metrics:

$$cm_{pi} = \text{FLOOR}\left[\left[\frac{cm_i}{\max\_cm\_value + \epsilon}\right][2^{\gamma}]\right] \qquad \text{Eq. (4)}$$

where:
  $cm_{pi}$=processed confidence metric as quantized value of $cm_i$;
  max_$cm$_value=maximum value of $cm_i$;
  i=1, 2, . . . , B
  $\epsilon$=small positive value chosen so that the division always produces a number less than 1.

The floor function maps its argument to the nearest integer less than or equal to the argument. For example, if the maximum confidence metric possible from the micro combiner is 100, and the desired number of bits per transmitted confidence metric is 3, the formula is $$cm_{pi} = B\left[\left[\frac{cm_i}{\phi + 1}\right][2^3]\right] \qquad \text{Eq. (5)}$$

Various examples of confidence metric processing using different groupings and quantizations are listed in TABLE 1. In TABLE 1, $a_{in}$ represents the range of each of the input confidence metrics, $cm_i$, where i=1, . . . , B, $\gamma_{in}$ represents the number of binary bits used to represent $a_{in}$, $a_p$ represents the range of each of the output confidence metrics $cm_{pj}$, where j=1, . . . , G, $\gamma_p$ represents the number of binary bits used to represent $a_p$, G represents the number of groups per burst (assuming 116 data bits per burst as is the case in a GSM embodiment), $\text{BITS}_G$ represents the number of bits per group, and $\text{TOT}_{CM}$ represents the total number of bits per burst used for the confidence metrics of a confidence metric vector for a burst.

TABLE 1

| Example | $a_{in}$ | $\gamma_{in}$ | $a_p$ | $\gamma_p$ | G | $\text{BITS}_G$ | $\text{TOT}_{CM}$ |
|---|---|---|---|---|---|---|---|
| 1 | 200 | 8 | 200 | 8 | 116 | 1 | 928 |
| 2 | 200 | 8 | 7 | 3 | 116 | 1 | 348 |
| 3 | 200 | 8 | 200 | 8 | 4 | 29 | 32 |
| 4 | 200 | 8 | 200 | 8 | 2 | 58 | 16 |
| 5 | 200 | 8 | 7 | 3 | 4 | 29 | 12 |

In TABLE 1, Example 1 is the initial unprocessed confidence metric, Examples 2 and 5 employ quantization as set forth in Eq. (4) and Eq. (5) above and Examples 3, 4 and 5 employ grouping. Note that Example 5 employs a combination of both grouping and quantization.

The relationship between the performance of confidence metric processing as determined by the quality of the final signals output from the aggregator 17 of FIG. 2 and the total number of bits $\text{TOT}_{CM}$, depends on a number of factors. When the quality of the received signals is high, then the quality of the final signals output from the aggregator 17 tends to be high even when the total number of bits per burst is low. When the quality of the received signals is low, then the quality of the final signals output from the aggregator 17 tends to be higher when the total number of confidence metric bits sent per burst is higher. The total number of bits per burst allocated to confidence metrics affects the capacity of the system as well as the quality of the signals. Higher numbers of bits allocated for confidence metrics reduces the number of bits available for other purposes such as for increased numbers of users in the system. In light of this trade off between quality and capacity, the performance of the system is enhanced if more confidence metric bits are allocated to improving poorer quality initial signals where the improvement is needed than are allocated to improving higher quality initial signals where the improvement is not needed.

Figure 6:
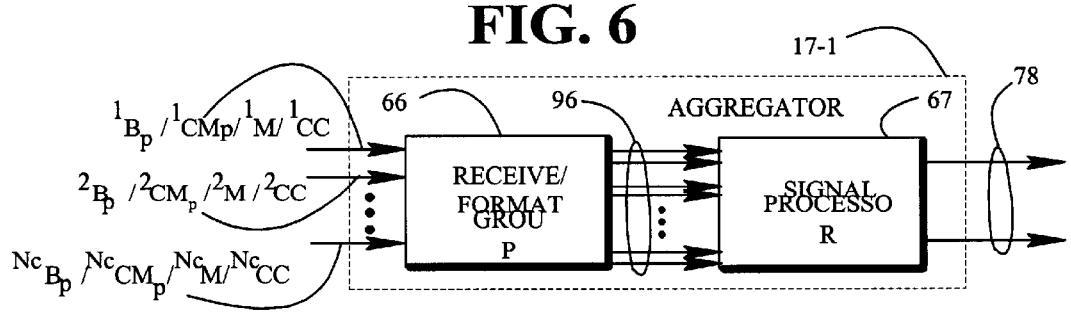
FIG. 6 depicts a block diagram representation of an aggregator.
Figure 7:
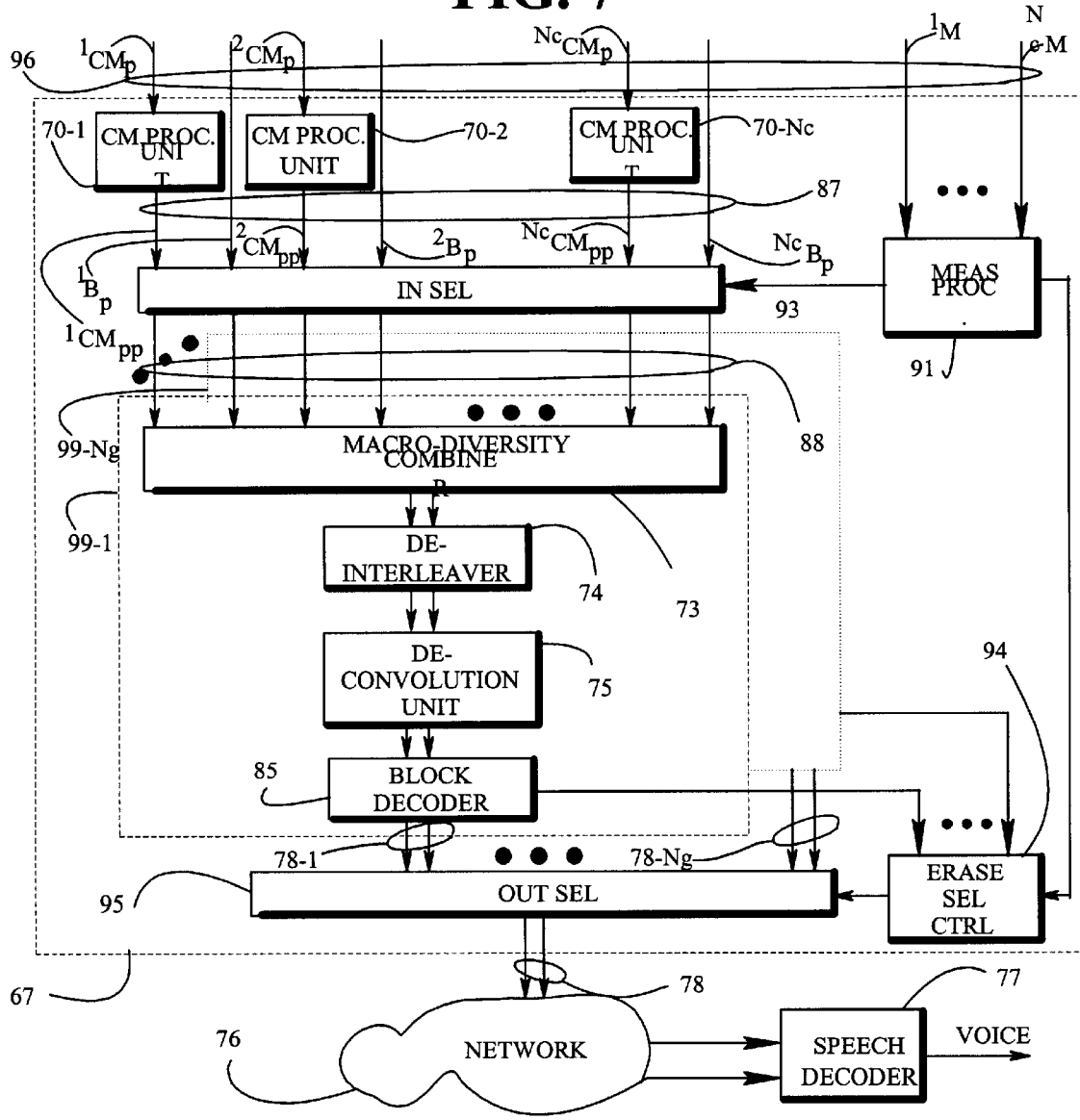
FIG. 7 depicts a detailed representation of an embodiment of the aggregator of FIG. 6.

Aggregator—FIG. 6 and FIG. 7

In FIG. 6, a block diagram representation of the aggregator 17 is shown. The aggregator 17 includes a receive/format group 66 which operates to receive and format signals transmitted by the signal transmit unit 44 of collectors 45 of FIG. 3. The received signals $^1B_p/^1CM_p/^1M/^1CC$, $^2B_p/^2CM_p/^2M/^2CC$, . . . , $^{Nc}B_p/^{Nc}Cm_p/^{Nc}M/^{Nc}CC$, after formatting are connected to the signal processor 67 which processes the received signals for macro-diversity combining. The format group 66 uses the time stamp and other control code (CC) information to align the signals from different collectors for the same user. More specifically, the format unit 66 for each one or more bursts compares and aligns the time stamps from the control fields $^1CC$, $^2CC$, . . . , $^{Nc}CC$ so that the corresponding data, confidence metric and measurement signals from different collectors, for the same common burst from a user are aligned.

In FIG. 7, further details of the signal processor 67 for the aggregator 17 of FIG. 6 are shown. The signal processor 67 of FIG. 7 is a representation of the processing of burst signals from a single one of the users, for example user 15-1 of FIG. 2 and the $N_c$ representations of the reverse channel signal from the user as received through the $N_c$ active collectors, such as the collectors 45-1, 45-2, . . . , 45-$N_C$ in FIG. 2.

In FIG. 7, the $N_c$ data, metric and measurement values at 96 for a single user include the data and processed confidence metric pairs [$^1B_b$, $^1CM_p$], [$^2B_b$, $^2CM_p$], . . . , [$^{Nc}B_b$, $^{Nc}CM_p$] and the measurement values, $^1M$, $^2M$, . . . , $^{Nc}M$. The processed confidence metrics, $^1CM_p$, $^2CM_p$, . . . , $^{Nc}CM_p$ are processed in the aggregator CM processing units 70-1, 70-2, . . . , 70-Nc, respectively, to form the aggregator processed confidence metrics, $^1CM_{pp}$, $^2CM_{pp}$, . . . , $^{Nc}CM_{pp}$. The aggregator processed confidence metrics, $^1CM_{pp}$, $^2CM_{pp}$, . . . , $^{Nc}M_{pp}$ together with the data bits, $^1B_b$, $^2B_b$, . . . , $^{Nc}B_b$, at 87 are input to the input selector 93 which selects one or more aggregator processed confidence metrics and corresponding data bits for each of the combiner unit groups 99 including combiner unit groups 99-1, . . . , 99-$N_g$. The selected aggregator processed confidence metrics, $^1CM_{pp}$, $^2CM_{pp}$, . . . , $^{Nc}CM_{pp}$ together with the corresponding selected data bits of bursts $^1B_bb$, $^2B_b$, . . . , $^{Nc}B_b$, are input at 88 to macro-diversity combiners like macro-diversity combiner 73 in combiner unit 99-1.

The combiner unit group 99-1 is typical of the combiner unit groups 99-1, . . . , 99-$N_g$ and includes the macro-diversity combiner 73, de-interleaver 74, de-convolution unit 75 and block decoder 85. The data and metric values from the combiner 73 are de-interleaved in the de-interleaver 74 and de-convolved (that is, the convolutional coding is removed) in de-convolution unit 75. The data and metric outputs from the de-convolution unit 75 connect to the block decoder unit 85 to form the output pair 78-1. Specifically, the combiner unit groups 99-1, . . . , 99-Ng provide the output pairs 78-1, . . . , 78-Ng that are input to the output selector 95. The output selector 95 selects one of the output pairs 78-1, . . . , 78-Ng as the final output pair 78 that connects to communications network 76 and, ultimately, after connection through the network, to a speech decoder 77 to re-establish a user voice signal that corresponds to the user voice signal that was input to the transceiver of the user 15 in FIG. 2.

The FIG. 7 signal processor 67 includes a measurement processor 91 that receives the measurement signals $^1M$, $^2M$, . . . , $^{Nc}M$ and processes them to determine which ones or all of the data and metric values are actually used in the macro-diversity combiners 73 in each of the combiner unit groups 99. As one example, the measurement signals are measures of the power of the received bursts and any burst that has a power level that is below a threshold is not selected for further processing. The selector 93 selects different ones of the data and metric input pairs as inputs to the macro-diversity combiners 73. The FIG. 7 signal processor 67 in a simple embodiment does not use the measurement signals $^1M$, $^2M$, . . . , $^{Nc}M$.

In FIG. 7 and in one embodiment, the measurement processor 91 provides weighting factors $^1w_b$, $^2w_b$, . . . , $^\alpha w_b$, . . . , $^{Nc}w_b$ corresponding to the data bits $^1\beta_p$, $^2\beta_p$, . . . , $^{Nc}\beta_p$ of a burst. The weighting factors are used, for example, to weight the combination of bit values based upon a measurement parameter from measurement processor 91.

The data and metric values from the combiners 73 are de-interleaved in the de-interleavers 74 and de-convolved in de-convolution units 75, respectively. The data and metric outputs from the de-convolution units 75 connect to the block decoders 85, respectively, which in turn connect to the output selector 95. The output selector 95 operates, for example, on frame erasure signals from the block decoders 85 which are input to the erasure select control 94. The erasure select control 94 may inhibit any of the outputs 78-1, . . . , 78-Ng from block decoders 85 from being selected as the output 78 when a frame erasure signal is present. When more than one of the outputs is available without a frame erasure signal, the one selected is the one corresponding to a particular measurement signal from measurement processor 91. For example, one having the highest power level is selected. The block decoders 85 connect through output selector 95 to the communications network 76 and ultimately after connection through the network to a vocoder 77, to re-establish a voice signal that corresponds to the user voice signal that was input to the user transceiver.

Figure 8:
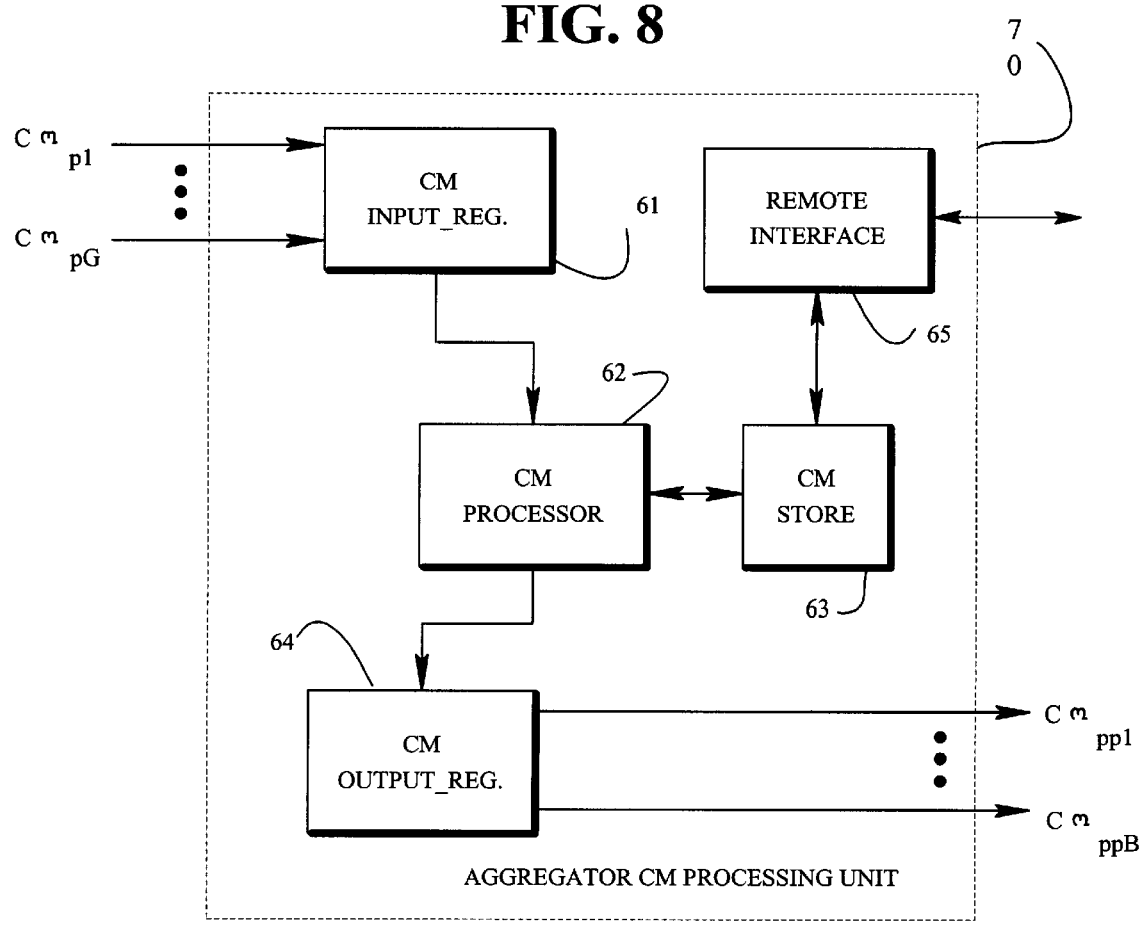
FIG. 8 depicts a block diagram representation of an aggregator processing unit for processing of confidence metrics.
Figure 9:
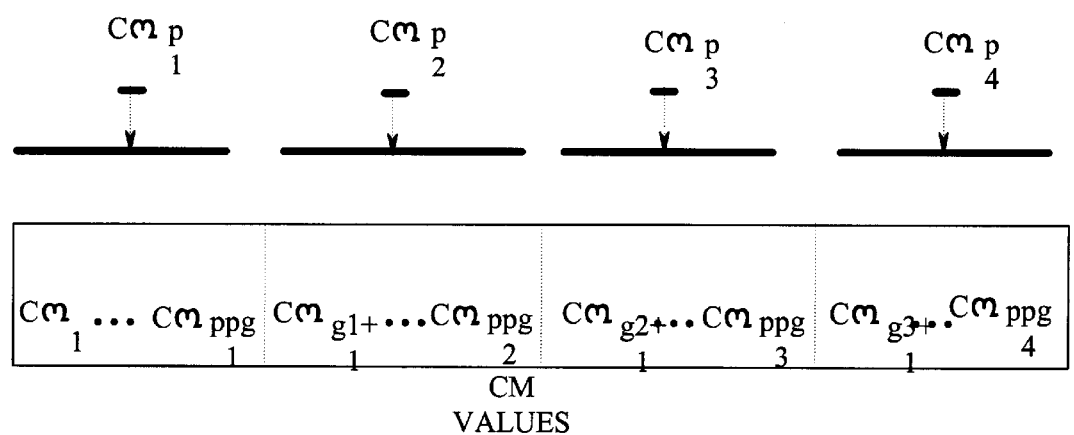
FIG. 9 depicts a block diagram representation of uncompression of compressed confidence metrics.

Aggregator Confidence Metric Processing Unit—FIG. 8 And FIG. 9

In FIG. 8, the aggregator CM processing unit 70 is typical of the CM processing units 70-1, 70-2, . . . , 70-$N_c$ of FIG. 7. The processed confidence metric vectors $^1CM_p$, . . . , $^\theta CMCM_p$, . . . , $^{Nc}CM_p$ are input one at a time to the CM input register 61. Each processed confidence metric vector, $^\theta CMCM_p$, includes as an input the processed confidence metrics $^\theta CMCM_{p1}$, . . . , $^\theta CM_{pG}$ and produces as an output the output confidence metrics $^\theta CM_{pp1}$, . . . , $^\theta CM_{ppG}$. The type of processing performed in the aggregator CM processing unit of FIG. 8 complements the type of processing performed in the collector CM processing unit of FIG. 4. Specifically, when the confidence metrics have been grouped in the collector CM processing unit of FIG. 4, the aggregator CM processing unit of FIG. 8 ungroups the confidence metrics.

In FIG. 8, the CM processor 62 in a grouped confidence metric embodiment operates for each grouped confidence metric to provide ungrouped confidence metrics, one for each data bit. By way of the FIG. 5 example, and referring to FIG. 5, the initial confidence metrics $^\theta CM_1$, $^\theta CM_2$, . . . , $^\theta CM_b$, . . . , $^\theta CM_B$ for one burst were divided into four groups. In FIG. 8 the grouped confidence metric $^\theta CM_{p1}$, is processed to provide the aggregator output confidence metrics $^\theta CM_1$, . . . , $^\theta CM_{g1}$ for group G1; the grouped confidence metric $^\theta CM_{p2}$ is processed to provide the aggregator output confidence metrics $^\theta CM_{(g1+1)}$ . . . , $^\theta CM_{g2}$ for group G2, the grouped confidence metric $^\theta CM_{p3}$ is processed to provide the aggregator output confidence metric $^\theta CM_{(g2+1)}$, . . . , $^\theta CM_{g3}$ for group G3; and the grouped confidence metrics $^\theta CM_{p4}$ is processed to provide the aggregator output confidence metrics $^\theta CM_{(g3+1)}$, . . . , $^\theta CM_{g4}$ for group G4. The processing for each grouped confidence metric in the aggregator is achieved, in one embodiment, by setting each of a plurality of aggregator output confidence metrics equal to the grouped confidence metric value for its corresponding group.

In FIG. 8 for the FIG. 9 example, the input to register 61 for each of the 1, . . . , $N_c$ collectors is the grouped confidence metrics $CM_{p1}$, $CM_{p2}$, $CM_{p3}$ and $CM_{p4}$ and the output, after processing in the CM processor 62, is the aggregator output confidence metrics $^\theta CM_1$, $^\theta CM_2$, . . . , $^\theta CM_b$, . . . , $^\theta CM_B$ stored in the register 64. The aggregator output confidence metrics, $^\theta CM_{(g1+1)}$, $^\theta CM_2$, . . . , $^\theta CM_b$, . . . , $^\theta CM_B$, are not a one-for-one reconstitution of the initial confidence metrics, $CM_1$, $CM_2$, . . . , $CM_b$, . . . , $^\theta CM_B$, since the confidence metric processing may be lossy in that some information is lost. Not with standing the lossy processing, overall system operation is enhanced by allowing flexibility in trade-offs between quality, bandwidth and capacity.

In FIG. 8, the CM store 63 stores control code and information for the algorithms used to process the grouped confidence metrics from the CM input register 61 to form the confidence metrics in the CM output register 64. In the example described, store 63 determines that the input of the metrics has been divided into four groups and causes each confidence metric of a group to be equal to the average determined in the CM processing unit 49 of FIG. 4. Other control algorithms are stored in the CM store 63 of FIG. 8 to match the operation of the collector CM processing unit of FIG. 4.

Combining Processed Confidence Metrics

The aggregator 17 of FIG. 6 receives a plurality of bursts $^1B_p$, . . . , $B_p$, . . . , $^{Nc}B_p$, representing the reverse channel signals for the same particular one of the users 15 and combines them based on quality metrics. Each burst such as typical burst, $^\theta B_p$, includes data bits $\beta_{p1}$, $\beta_{p2}$, . . . , $\beta_{pb}$, . . . , $\beta_{pB}$, and a confidence metric vector, CM, having confidence metrics, $CM_1$, $CM_2$, . . . , $CM_b$, . . . , $CM_B$. The confidence metrics $CM_1$, $CM_2$, . . . , $CM_b$, . . . , $CM_B$, are represented by the signed numbers $s_1c_1$, $s_2c_2$, . . . , $s_bc_b$, . . . , $s_Bc_B$. In the embodiment described, the logical 1 and logical 0 values of the data bits, $\beta_{p1}$, $\beta_{p2}$, . . . , $\beta_{pb}$, . . . , $\beta_{pB}$, in the data burst represent signs $s_1$, $s_2$, . . . , $s_b$, . . . , $s_B$ of the confidence metrics where a 1 for a data bit is positive sign and a 0 for a data bit is a negative sign.

In an embodiment where $N_c$ representations, $^1\beta_{pb}$, $^2\beta_{pb}$, . . . , $^{Nc}\beta_{pb}$, of each bit such as typical bit, $\beta_{pb}$, are generated with Nc confidence metrics, $^1cm_b$, $^2cm_b$, . . . , $^\alpha cm_b$, . . . , $^{Nc}cm_b$ for each bit, each measured by numbers $^1c_b$, $^2c_b$, . . . , $^\alpha c_b$, . . . , $^{Nc}c_b$, respectively, with each number $^\alpha c_b$ ranging between 0 and +$\alpha$ and where $^\alpha s_b$ is the sign, the average aggregate confidence metric, $^{agg}c_b$ for each bit b is as follows:

$$^{agg}c_b = \frac{1}{N_c}\sum_{\alpha=1}^{N_c} {}^{\alpha}s_b({}^{\alpha}c_b + 1) \quad \text{Eq. (6)}$$

In an example where the number of collectors $N_c$ is equal to 3, the calculations for a single one of the bits b is as follows:

$$^{agg}c_b = \frac{1}{3}({}^1s_b({}^1c_b + 1) + {}^2s_b({}^2c_b + 1) + {}^3s_b({}^3c_b + 1)) \quad \text{Eq. (7)}$$

The Eq. (4) confidence metric combining is useful where soft decision information is available for each bit of data. One embodiment for generating the initial soft decision information in the form of initial confidence metrics uses micro-diversity processing at collectors having two or more spatially diverse antennas 48-1, ..., 48-Na as described in connection with FIG. 2.

Referring to the collectors of FIG. 3, for example, macro-diversity is achieved with the spatially macro-diverse collectors 45-1, ..., 45-Nc where in an example if $N_c$=3, the collectors are 45-1, 45-2 and 45-3 (45-2 and 45-3 are not explicitly shown in FIG. 2). A numerical examples is as follows:

$$a = 200 \quad \text{Eq. (8)}$$
$$\gamma = 8$$
$$^1c_b = 103.33 \text{ (Collector 45 – 1)}, ({}^1\beta_b = 0)$$
$$^2c_b = 56.69 \text{ (Collector 45 – 2)}, ({}^2\beta_b = 0)$$
$$^3c_b = 166.67 \text{ (Collector 45 – 3)}, ({}^3\beta_b = 1)$$

The FLOOR function as described in Eq. (4) is applied to the values of Eq. (8) and these values are then forwarded from the collector to the aggregator. At the aggregator, the data bits $^1\beta_b$, $^2\beta_b$ and $^3\beta_b$ having values 0, 0 and 1, respectively, are mapped to the signs $^1s_b$, $^2s_b$ and $^3s_b$ having values −1, −1 and +1, respectively, and then Eq. (7) becomes:

$$^{agg}c_b = \frac{1}{3}((-1)(103+1) + (-1)(56+1) + (+1)(166+1)) = 2 \quad \text{Eq. (9)}$$

In this example, although the magnitude of the negative values for confidence metrics $^1C_b$ (−103) for the path 1 (from a collector 45-1 of FIG. 2) and $^2C_b$ (−56) for path 2 (from a collector 45-2 not explicitly shown in FIG. 2) indicate a 0 bit, the positive value of confidence metric $^3C_b$ for path 3 (from a collector 45-3 not explicitly shown in FIG. 2) indicates a 1 bit with a magnitude that is large enough to outweigh the negative magnitudes for confidence metrics $^1c_b$ and $^2c_b$.

For the case where micro-diversity equalization occurs at the collectors and aggregation occurs at an aggregator (where the aggregator is remotely located at a BTS, for example), the number of confidence metrics and the precision (range) of those metrics is limited in order to conserve bandwidth. Where the back haul design only allocates a few bits for transmitting confidence metrics, the number of bits in the initially formed confidence metrics at the collectors needs to be reduced. For example, if 3-bit integers are allocated for transmitting confidence metrics, then the range, $\alpha$, of values transmitted is from 0 to 7 (or 1 to 8) where $\gamma$ indicates the size in bits of the metric and the range, $\alpha$, is $2^\gamma$.

Let $c_p$ be the magnitude of the processed confidence metric derived from processing the initial confidence metric, $c_{in}$, represented by a $\gamma$-bit integer. Then the following algorithm is used to reduce the number of confidence metric bits required:

$$c_p = \text{FLOOR}\left[r\frac{c_{in}}{a}\right] \quad \text{Eq. (10)}$$

From the previous example with a =200, Eq. (10) becomes for each path $$^1c_p = \text{FLOOR}\left[8\frac{103.33}{200}\right] = 4, ({}^1\beta_b = 0) \quad \text{Eq. (11)}$$
$$^2c_p = \text{FLOOR}\left[8\frac{56.67}{200}\right] = 2, ({}^2\beta_b = 0)$$
$$^3c_p = \text{FLOOR}\left[8\frac{166.67}{200}\right] = 6, ({}^3\beta_b = 1)$$

The values of Eq. (11) are transmitted from the collectors to the aggregator. At the aggregator, the data bits $^1\beta_b$, $^2\beta_b$ and $^3\beta_b$ having values 0, 0 and 1, respectively, are mapped $$c_p = \frac{1}{3}((-1)(4+1) + (-1)(2+1) + (+1)(6+1)) = -\frac{1}{3} \quad \text{Eq. (12)}$$

The small negative value determined by Eq. (12) for the processed confidence metric indicates low confidence that the bit is a 0.

The bit-by-bit confidence metric aggregation is implemented at the aggregator using the 3-bit confidence metric representation with each data bit transmitted from the collector. A normal GSM burst has 116 coded data bits. Therefore, using 3-bit confidence metrics, an additional 348 bits of confidence metric information needs to be transmitted for each burst from each collector. In order to reduce the number of confidence metric bits further, in embodiments, the confidence metrics are grouped. One processed confidence metric can be used for different group sizes. For example, one metric can be used for every half burst of data, for every quarter burst of data or for every 4 bits of data. If 3-bit confidence metrics are grouped on a half burst basis, this requires that each burst transmit an additional 6 bits of data, 3 additional bits for the confidence metric for each half of the data segment.

The algorithm for forming one grouped confidence metric, $c_{pg}$, for a group of n confidence metrics and then aggregating is as follows. The processed grouped confidence metric, $c_{pg}$, for a group of n confidence metrics for a corresponding n data bits, with the bit number for a group indicated by the subscript, k, is given by averaging the confidence metrics of the group as follows:

$$^ic_{pg} = \text{FLOOR}\left(\frac{1}{n}\sum_{k=1}^{n} r\frac{^ic_k}{a}\right) \quad \text{Eq. (13)}$$
$$= \text{FLOOR}\left(\frac{1}{n}(r)\frac{1}{a}\sum_{k=1}^{n} {}^ic_k\right)$$

For example, for a grouping of confidence metrics for four data bits path1  $^1c_1 = 103.33$   $^1c_2 = 80.00$   $^1c_3 = 123.33$   $^1c_4 = -70.00$    Eq. (14)

path2  $^2c_1 = -56.67$   $^2c_2 = 156.67$  $^2c_3 = 80.00$   $^2c_4 = 43.33$ path3  $^3c_1 = 166.67$   $^3c_2 = -70.00$  $^3c_3 = 183.33$  $^3c_4 = 186.67$ Eq. (13) becomes:

$$^1c_{pg} = \text{FLOOR}\left(\frac{1}{4}8\frac{1}{200}\sum_{k=1}^{4} {}^1c_k\right) = 3 \quad \text{Eq. (15)}$$

$$^2c_{pg} = \text{FLOOR}\left(\frac{1}{4}8\frac{1}{200}\sum_{k=1}^{4} {}^2c_k\right) = 3$$

$$^3c_{pg} = \text{FLOOR}\left(\frac{1}{4}8\frac{1}{200}\sum_{k=1}^{4} {}^3c_k\right) = 6$$

The grouped values of Eq. (15) are transmitted from the three different collectors 45 to an aggregator 17. The aggregator performs the ungrouping by assigning the group value to each of the ungrouped values, one for each data bit, of a group. The signals are then aggregated, on a bit by bit basis, using voting that is weighted by the grouped metrics according to Eq. (7) as follows:

$$^{agg}c_{p1} = \frac{1}{3}((-4)+(-4)+(7)) = -.333 \quad \text{Eq. (16)}$$

$$^{agg}c_{p2} = \frac{1}{3}((4)+(4)+(-7)) = .333$$

$$^{agg}c_{p3} = \frac{1}{3}((4)+(4)+(7)) = 5$$

$$^{agg}c_{p4} = \frac{1}{3}((-4)+(4)+(7)) = 2.333$$

If grouping is done on a half burst basis using 3-bit integers for the confidence metric, Eq. (13) is as follows:

$$^ic_{pg} = \text{FLOOR}\left(\frac{1}{58}(8)\frac{1}{a+\epsilon}\sum_{k=1}^{58} {}^ic_k\right) \quad \text{Eq. (17)}$$

Weighted Averaging

In an embodiment where $N_c$ representations, $^1\beta_{pb}$, $^2\beta_{pb}$, ..., $^{Nc}\beta_{pb}$, of each bit are generated with confidence metrics, $^1cm_b$, $^2cm_b$, ..., $^{Nc}cm_b$, each measured by numbers $^1s_b{}^1c_b$, $^2s_b{}^2c_b$, ..., $^{Nc}s_b{}^{Nc}c_b$, respectively, with each number $^\alpha s_b{}^\alpha c_b$ ranging between $(-\alpha)$ and $(+\alpha)$ and with the weighting values, $^\alpha w_b$ for each bit b, the average aggregate confidence metric, $^{agg}c_b$ for each bit b, is as follows:

$$^{agg}c_b = \frac{1}{N_c}\sum_{\alpha=1}^{N_c} {}^\alpha w_b{}^\alpha s_b({}^\alpha c_b + 1) \quad \text{Eq. (18)}$$

Non-linear Quantizing

Alternative methods for scaling and quantizing from initial values of $\gamma_{in}$-bits for each initial confidence metric reduced to $\gamma_p$-bits for each processed confidence metric take advantage of the nature of the distributions of confidence metric magnitudes for good bits versus bad bits.

One non-linear method of quantization is a logarithmic mapping function where the following logarithmic mapping function is an example:

$$c_p = \text{ROUND}\left[\frac{7}{6}\log_2\left(\frac{(c_{in}+1)(126)}{a}\right)-1\right] \quad \text{Eq. (19)}$$

The mapping of Eq. (19) achieves the same degree of compression as the linear mapping, but the aggregation gain is larger for Eq. (19). Eq. (19) has the advantage that less information is sent for the high end of the range where there is less chance of confusing good bits with bad.

Bandwidth Control

Bandwidth control of collector-to-aggregator reverse channel communications is important for overall system efficiency and is implemented in both static and dynamic embodiments. The embodiment used is a function of the system environment considering many factors including the number and density of users, the relative locations of users, collectors and aggregators, the physical environment including the terrain, buildings and other signal interferers and the dynamics under which the system is undergoing change from moment to moment. The bandwidth control functions are implemented at both collectors and at aggregators and are also implemented at zone and region managers. The conditions for bandwidth control are implemented by storage of parameters and algorithms in either or both local storage (CM store 63 of FIG. 4) and central storage (CM store 63 of FIG. 8).

In the simplest embodiments, static bandwidth control is implemented where the system is tuned for the desired bandwidth operation without need for dynamic changes. Static bandwidth control is useful for example where relatively poor signal quality exists widely so that high or maximum confidence metric bandwidth is always employed to achieve acceptable signal quality in a poor transmission environment. In another embodiment, static bandwidth control is useful for example where the premium is on maximum signal quality irrespective of the bandwidth requirements.

Where capacity, quality, bandwidth and cost are interrelated parameters, then dynamic bandwidth control is important. Distributed intelligence at the collectors is useful for bandwidth conservation. Distributed intelligence at collectors includes means for decoding, for checking parity and other conditions and for setting confidence metric bandwidth. Parity checking of block coded signals such are used in GSM can give a reliable objective indication of received signal quality. The system including the collectors operate in various modes including operations based only on local collector information and including operations based upon central information from a central control (at an aggregator for example).

Centralized intelligence (at an aggregator for example) is important in many embodiments for bandwidth conservation. Often, a single collector does not have access to sufficient local information to make adequate bandwidth decisions. Each of the collectors alone cannot be aware of the performance of other collectors based only on the information available locally irrespective of how much processing power each of the collectors has. A common condition where one collector does not have adequate local information for a particular user occurs when some other particular collector is receiving a strong enough signal from that user to particularly enable acceptable quality to be achieved solely with the information from that collector without aggregation of signals from that one collector or from other collectors. Centralized information in this example is effective in allocating bandwidth among the macro-diverse collectors by causing the particular collector to be active and all other collectors to be inactive or operative in low bandwidth modes.

Large bandwidth savings are attained using centralized control information gathered from multiple macro-diverse collectors. The centralized control information is used to dynamically control the amount of confidence metric information transmitted by the macro-diverse collectors. The dynamic control is implemented using bandwidth control messages (over a control link between the centralized aggregator and the distributed collectors) that commands the collectors to different bandwidth modes based upon centralized information and based upon local information. In one embodiment, an LAPD-M link implemented in a T1 wireline connection can be used for the bandwidth control message channel although the faster the control message link, the better the system performance. A point-to-point radio T1 link is an example of a lower latency connection than a wireline connection.

In one embodiment, communications between collectors and aggregators indicate the format of each returned burst in a 4-bit code word. An example encoding appropriate for a GSM embodiment has the 4 bits (3, 2, 1, 0) split into two 2-bit fields (xx, yy) in TABLE 2 as follows:

TABLE 2

| Field 1: Grouping Code (bits 3 and 2) | |
|---|---|
| xx = 00 | 0 = off mode (send nothing, not even data bits) |
| xx = 01 | 1 = group each burst into 2 groups |
| xx = 10 | 2 = group each burst into 4 groups |
| xx = 11 | 3 = N groups, each confidence metric is sent individually |
| Field 2: Quantization Code (bits 1 and 0) | |
| yy = 00 | 0 = 2 bit non-linear quantization |
| yy = 01 | 1 = 3 bit linear quantization |
| yy = 10 | 2 = 3 bit non-linear quantization |
| yy = 11 | 3 = 8 bit linear quantization |

Various different bandwidth modes are available for each collector extending from full off (xx=00) to a range including, for example, minimum (xx=01), intermediate (xx=10) and maximum (xx=11) bandwidth levels. In the full off mode, neither data bits nor confidence metrics are sent back from a collector to the aggregator. In all other modes, at least the data bits are sent back and often one or more confidence metric bits are sent back. In addition to the Grouping Code (xx), the range of each confidence metric is determined by the Quantization Code (yy). These different modes are selected to keep quality acceptable while also reducing the bandwidth utilized in order to conserve bandwidth. The bandwidth not used for data bits and confidence metrics is available for other uses such as increased capacity of the system or increased quality for other parts of the system. Backhaul bandwidth from a collector is shared by all users serviced by that collector, so reducing the bandwidth required for some users allows more users to share a particular communications link.

An example of the usefulness of dynamic centralized control is apparent when a collector that has been receiving a strong signal for a user, without need for aggregation of signals from other collectors for that user, suddenly no longer can service the needs of the user alone without unacceptable quality deterioration. The dynamic bandwidth control senses the reduced quality and switches the mode of operation, for example, from a single collector operation without aggregation to a multiple collector operation where the signals from multiple collectors are combined for a single user. If required, one or more of the multiple collectors are also set to increased confidence metric bandwidth levels in order to compensate for the quality deterioration of the single collector initially active or to compensate for the quality deterioration of all the collectors, in addition to the initially active collector, that become active for that user.

An advantage of having the redundant collectors operate in a minimum bandwidth mode, such as one of the grouping modes requiring a small number of bits, rather than a full off mode, is that when one active collector no longer receives a strong enough signal to maintain acceptable quality, the aggregator can respond quickly to combine confidence metrics from other collectors operating in minimum bandwidth modes. Although reduced quality may result during the time elapsed when a bandwidth control message is sent and the message-receiving collectors responsively are set to a higher bandwidth mode, the signal is not lost altogether as is likely to occur if no confidence metrics are being sent because of operation in a full off mode.

Local Bandwidth Control

In FIG. 1, a user may be located near a collector 45 or near an aggregator 17. In the absence of centralized (remote) control, the local control at the collector operates to determine the bandwidth in accordance with a mode of operation stored in the CM store 63.

In the absence of a central bandwidth command, the collector receiving the user signal stores a local high threshold value, $T_h$, and stores a low threshold value, $T_h$. When the signal strength (or other quality measure) is above the high threshold value, $T_h$, then a default minimum bandwidth is set; for example xx=01 and yy=00. When the signal strength is between the high threshold value, $T_h$, and the low threshold value, $T_{1h}$, then a default intermediate bandwidth is set, for example, xx=10 and yy=01. When the signal strength is less than the low threshold value, $T_{1h}$, then the default maximum bandwidth is set, for example xx=11 and yy=11. The foregoing examples are merely by way of illustration as many variants of thresholds and default values are possible.

If the control method employed exhibits unwanted control behavior, then filtering and other control processing can be introduced. For example, where the rate of state changes is excessive about the lower threshold, a hysteresis mode of operation is selected.

Assuming for example that the local hysteresis mode is activated, CM store 63 stores an upper hysteresis threshold, $T_{uh}$, and a lower hysteresis threshold, $T_{1h}$. The processing unit 49 in FIG. 4 also stores a hysteresis toggle bit, $H_{tb}$, that is set and reset as a function of the processing to eliminate excessive oscillations.

When processing commences at Time=0, it is assumed for purpose of explanation that the hysteresis toggle bit, $H_{tb}$, is in the reset state, that the signal level is above the lower hysteresis threshold, $T_{1h}$, and that the confidence metric bandwidth is set to a reduced level for conserving bandwidth in the reverse channel. As long as the signal level remains above the lower hysteresis threshold, $T_{1h}$, the CM processor 62 functions to maintain the operation at a reduced confidence metric bandwidth level. The algorithm for producing the particular reduced confidence metric bandwidth is selected from any one of a number of possibilities such as grouping with different size groups and range compression.

When the signal value drops below the upper hysteresis threshold, $T_{uh}$, the confidence metric bandwidth is not changed and remains at a previously set reduced bandwidth value.

When the signal value first drops below the lower hysteresis threshold, $T_{1h}$, the CM processor 62 functions to set the operation for a higher confidence metric bandwidth level, for example, at the full maximum confidence metric bandwidth level. With the hysteresis toggle bit, $H_{tb}$, in the set state, the confidence metric bandwidth value is not switched to a reduced bandwidth value until the signal strength has exceeded the upper hysteresis threshold, $T_{uh}$.

When the signal value again exceeds the upper hysteresis threshold, $T_{uh}$, the CM processor 62 functions to set the operation for a reduced confidence metric bandwidth level. At this time, the hysteresis toggle bit, $H_{tb}$, is reset.

Threshold Level Controls

In some embodiments, a high threshold, $T_h$, is present for indicating that only reduced confidence metric bandwidth levels are required. Whenever the signal level is above the high threshold, $T_h$, a collector when enabled for such control, subject to possible overrides from the remote commands, transmits only at a reduced confidence metric bandwidth level. Increasing and decreasing the value of the high threshold, $T_h$, will increase and decrease the bandwidth used by the system.

The lower hysteresis threshold, $T_{1h}$, and the upper hysteresis threshold, $T_{uh}$, are set in order to help control the reverse channel bandwidth used for confidence metrics. Raising the lower hysteresis threshold, $T_{1h}$, increases bandwidth usage since the system will operate to send full confidence metrics more frequently. Similarly, lowering the lower hysteresis threshold, $T_{1h}$, decreases bandwidth usage since the system will operate to send full confidence metrics less frequently.

In some embodiments, the aggregator sets the threshold levels used by different collectors based upon a bandwidth allocation among multiple collectors in order to tune the system for efficient bandwidth utilization.

Centralized Control Based Upon Multiple Collector Signals

For some embodiments, the mean signal level for the C2 collector of FIG. 1 is greater than for the C1 collector of FIG. This difference in mean signal levels is primarily due to the location of the U2 user relative to the collectors C1, C2 and C3. The U2 user is closest to the C2 collector and hence the mean signal strength at the C2 collector is highest. The U2 user is farther from the C1 and C3 collectors and hence the mean signal strength at the C1 and C3 collectors is lower. The signal strength from a user at a particular collector is approximately proportional to $1/D^4$ where D is the distance between the user and the particular collector. Using a collector separation of 10 kilometers(km), U2 in the example described is about 3 km from C2, about 7.5 km from both C1 and C3. This arrangement results, in one example, in mean signal levels −4.5 dB, 11 dB and −4.6 dB, respectively, for collectors C1, C2 and C3 relative to a reference level of 0 dB, which represents the mean signal strength of a user 15 at the center of the triangle formed by C1, C2 and C3.

Whenever the signal is below a threshold level, then at least one of the collectors C1, C2 and C3 is receiving the U2 user signal with sufficient strength so as not to require the maximum amount of confidence metric information to assure sufficient quality of operation. Therefore, all collectors can be commanded to send less confidence metric information back. In this example, the threshold is set at 0 dB, the relative mean signal strength of a user 15 at the center of the triangle. However, depending on the environment, the required threshold can be some higher or lower signal level.

The decision variables can be set directly by using signal levels. In one embodiment, the decision variables are set based on signal quality, which can be measured using Frame Erasure Rate (FER), that is, block code parity checking, such as is available in the GSM standard. The signal quality is, on average, a monotonic function of the signal levels.

If the collector having the strongest signal is not strong enough by itself for acceptable quality, but acceptable quality can be obtained with confidence metric combining, then the bandwidth level of the confidence metrics must be determined. The stronger the signals, the less confidence metric information required and the weaker the signals the more confidence metric information required.

If one of the collectors has a very strong signal for a user that far exceeds the level sufficient by itself to assure acceptable quality, then the other collectors are commanded to full off mode in which neither confidence metrics nor data bits are sent for that user.

If the best one of the collectors has a strong signal for a user that marginally exceeds the level sufficient by itself to assure acceptable quality, then the other collectors are commanded to a minimum bandwidth level where compressed confidence metrics and data bits are sent for that user. The advantage of sending at least the data bits and some confidence metric information is that in the event of signal deterioration below the acceptable signal threshold for single collector mode operation, the mode is immediately changed to multiple mode combining without any delay that would be incurred by sending messages back to the collectors. In order to increase the margin of safety, when signal quality begins to deteriorate in any mode of operation, messages are sent to change the mode of operation to a higher bandwidth level. Similarly, in order to take advantage of an increasing margin of safety, when signal quality begins to increase in any mode of operation, messages can be sent to change the mode of operation to a lower bandwidth level.

Whenever the signal is a less than a threshold, then two or more of the collectors C1, C2 and C3 are used for receiving the U2 user signal and these collector signals are combined to assure sufficient quality of operation. The combining can be a logical OR of signals processed relative to a threshold higher than 0 dB, for example, 5 dB. Whenever a signal is a above the threshold, then at least one of the collectors C1, C2 and C3 is receiving the U2 user signal with sufficient strength so as not to require combining multiple collector signals to assure sufficient quality of operation. Whenever the signal is tending toward less than the threshold, then it is anticipated that the system will shortly require more confidence metric information from two or more of the collectors C1, C2 and C3 to assure sufficient quality of operation. The anticipation is used to originate control messages to increase the confidence metric bandwidth or for signaling full off to be set to on so that enough information is conveyed to the aggregator to assure that the signal quality from the collector signals is adequate.

The difference in threshold levels used to generate waveforms determines the amount of time that is available for signaling changes in bandwidth modes of operation. In one particular embodiment, the messaging time between collectors and the aggregator is set to be less than 0.2 second. In such an embodiment, the threshold difference between threshold levels used to generate waveforms is adjusted to insure that at least a 0.2 second lead time is available. The messaging time and the thresholds are tunable parameters of the communication system. In general, a 0.2 second messaging time is adequate for most environments. For example, a vehicle moving at 50 kilometers/hour takes about 2 seconds of travel time (calculated by shadow fading spatial correlation statistics where 2 seconds is the time constant for a 1/e decay in correlation) before signal levels change enough to affect signal. Accordingly, 0.2 second messaging times can easily control changes in the system bandwidth well in advance of fast moving users.

In some environments, there are instances where spatial decorrelation occurs very suddenly and the signal quality deteriorates faster than the system can respond. In such environments, where the problem occurs at fixed locations in the zone, the locations where these problems occur are detected and are stored in memory. Whenever a user approaches one of these locations, the bandwidth is increased to anticipate the need for more confidence metric information to allow the multiple collector aggregation to maintain acceptable quality. This mode of operation requires information about the approximate location of the user. Such location information is determined from the timing of training sequences and the signal strength measurements such as are available in GSM and other protocols. Both signal strength and timing from multiple macro-diverse collectors are used to perform triangulation. When a user leaves such a location, the bandwidth is decreased.

In some environments, where signal quality problems occur in a manner that can be predicted based upon patterns of changes in user signals, these patterns are stored in memory and the occurrence of these patterns for a particular user are recognized by comparing the detected user parameters with the patterns stored in memory. Upon detection of a match, the bandwidth is increased to anticipate the need for more confidence metric information to allow the multiple collector aggregation to maintain acceptable quality. When the increased bandwidth is not needed, the bandwidth is decreased.

Collectors Commanded to full off Mode

A mobile user sending the center of the triangular region of FIG. 1 is received at all three collectors C1, C2 and C3 with mean signal strengths which are assigned a reference value of 0 dB. For the example, it is assumed that this mean signal level is also the lowest level at which the signal can be reliably aggregated when all collectors send back full confidence metrics. The objective is to calculate a distance from any single collector such that if a user 15 is within that distance, its signal is strong enough at the nearest collector that aggregation is not required. First, the signal level that is required for a particular environment is calculated, as characterized by the shadow fading standard deviation and path loss exponent. A constant-level signal that can be reliably aggregated at a reference level of 0 dB will be strong enough to process without aggregation at 5 dB. Therefore, if the signal is to be above 5 dB more than 99% of the time, the mean signal level is required to be at 5 dB+2 sigma, where sigma is the standard deviation of the log-normal shadow fading. If sigma=8 dB in this environment, that value implies that a mean signal level of 21 dB is required. Assuming for purposes of this example that the mean path loss in this environment is $1/D^4$ (a value typical for urban cellular radio) the equation for calculating the distance to meet any particular signal strength criterion is:

$$\text{Off-ModeRadius} = (\text{CollectorRadius}) * 10^{(-requiredDb/pathLossExponent * 10)}$$

In this equation, CollectorRadius is the distance from the center of a triangle of collectors to any collector. If in the example, the sides of the triangle in FIG. 1 are 10 km, the distance from any collector that a user 15 can be to meet the criterion for being in off mode is 1.7 km. Mobile users closer to any collector are expected to be at least 5 dB above the reference aggregation level more than 99% of the time.

Combined Signals

The results of combining are represented in the following TABLE 3 for different modes of confidence metric bandwidth where the quality of the combined output signal is measured by the frame erasure rate (FER).

TABLE 3

| Individual Collector | FER |
| --- | --- |
| C1 | 80% |
| C2 | 15% |
| C3 | 16% |

| Combined Collectors | Aggregated FER |
| --- | --- |
| Full CM | .5% |
| Grouped CM | 3% |
| Full off {C1 and C3 off} | 15% |

The savings in bandwidth can be appreciated by observing the amount of time that signals A, B and C are less than a threshold. In TABLE 3, the signal quality (measured by frame erasure rate) allows the system to determine the Least Significant collector signal (C1) and the Most Significant collector signal (C2) for purposes of bandwidth control as explained in connection with TABLE 4.

TABLE 4 indicates bandwidth utilization in the system under local control and under central control.

TABLE 4

| Collector(s) | Signal | Bandwidth Utilization |
| --- | --- | --- |
| C1 | A | 81.25 |
| C2 | B | 29.31 |
| C3 | C | 75.25 |
| Average C1, C2 and C3, Local Control | | 61.94 |
| C1, C2 and C3, Central Control @ 5.2 db | 13 | 37.75 |
| C1, C2 and C3, Central Control @ 0 db | 14 | 26.31 |

In TABLE 4, the Bandwidth Utilization column represents the bandwidth level relative to the maximum bandwidth level that is used for transmission for a single user. These values assume that bandwidth levels switch between no grouping, 3-bit quantization of the confidence metric and quarter burst grouping.

From TABLE 4, it is apparent that if the C1, C2 and C3 collectors each operate independently on only locally available information that collector C1 will send 81% of the maximum bandwidth level, that collector C2 will send 29% of the maximum bandwidth level and that collector C3 will send 75% of the maximum bandwidth level so that C1, C2 and C3 are on average sending at 61% of the maximum bandwidth level. However, a centralized aggregator using the OR function can determine that all collectors send at an average of 37% of the maximum bandwidth level. If collectors are switched to full off mode rather than to grouping mode, the savings are even greater but the system is more apt to be prone to quality deterioration when signal levels change suddenly.

Algorithms used to control system bandwidth levels rely on various system parameters. One parameter employed is the signal quality of the received user reverse channel. One measure of signal quality in GSM or similar systems is the frame error rate (FER) and the good frame rate (GFR) where GFR=(1-FER). In TABLE 5, three quality thresholds based on the GFR are indicated. The $T_{decrease}$ threshold is used to signal a decrease in bandwidth whenever the signal quality is above a GFR of 99.8%, the $T_{increase}$ threshold is used to signal an increase in bandwidth whenever the signal quality is below a GFR of 97% and the $T_{full}$ threshold is used to signal a change to full bandwidth whenever the signal quality is below a GFR of 94%.

TABLE 5

| Quality Threshold | GFR = (1-FER) |
|---|---|
| $T_{decrease}$ | 99.8% |
| $T_{increase}$ | 97% |
| $T_{full}$ | 94% |

Many different modes of bandwidth control are possible within the scope of the present invention. Exemplary control code for controlling the various modes of operation appears in the following TABLE 6. In TABLE 6, the italicized values of bandwidth levels (such as LocalMaximum, Reduced, Local Minimum, Local Intermediate and so forth are selected with different values for xx and yy in order to provide suitable different bandwidth levels. Some of the values in TABLE 6 are indicated by way of examples.

TABLE 6

COPYRIGHT 1997 CELLULAR TELECOM, LTD

AT EACH OF MULTIPLE USERS

For each user,
    Transmit user reverse channel signals

AT EACH OF MULTIPLE COLLECTORS

For each user,
    For each collector, receive user signals and process user signals to form collector signals
    (data and confidence metric),
        IF confidence metric bandwidth commanded as Central Bandwidth Level by central
        control in aggregator,
            Set Current Bandwidth Level to Central Bandwidth Level,
            Go to XMIT
        ELSE
            If set to Local Hysteresis Mode, then
                IF signal quality less than lower hysteresis threshold, $T_{lh}$,
                    Set bandwidth level to Local Maximum value,
                    Set hysteresis toggle bit, $H_{tb}$
                ELSE,
                    IF hysteresis toggle bit, $H_{tb}$ set and signal quality greater than
                    upper hysteresis threshold, $T_{uh}$,
                        Set Current Bandwidth Level to Reduced value,
                        Reset hysteresis toggle bit, $H_{tb}$
                    ELSE,
                        Set Current Bandwidth Level to Local Maximum value
                        Go to XMIT
            ELSE,
                IF signal quality less than lower threshold, $T_{lh}$,
                    Set Current Bandwidth Level to Local Maximum value,
                ELSE,
                    IF signal quality greater than high threshold, $T_h$,
                        Set Current Bandwidth Level to Local Minimum value
                    ELSE,
                        Set Current Bandwidth Level to Local Intermediate value,
XMIT. Transmit collector signals using Current Bandwidth Level
REPEAT

AT SINGLE AGGREGATOR

Determining Collector Signal Quality Module

For each user,
        For each collector,
            Measure and store collector signal quality,
        Order collectors according to collector signal quality rank
Selecting Participating Collectors Module For each user,
        Select Participating Collectors for user as function of collector signal quality rank, location
        or other parameters,

TABLE 6-continued

COPYRIGHT 1997 CELLULAR TELECOM, LTD

Combining Collector Signals Module

For each user,
        Form Combined Signal by combining individual signals from Participating Collectors
        Determine user location (Using time-of-arrival and other information from multiple macro-
        diverse collectors)
        Process collector signals to form Current Parameters for user and update History Store with
        Current Parameters (such as location and signal patterns), Centralized Collector Bandwidth Determining Module Create Desired Bandwidth Level list giving desired confidence metric bandwidth for all users
    on all backhaul links coming into the aggregator from collectors,
        For each user,
            If the signal quality of Individual Signal for a particular user exceeds high quality
            threshold, $T_{qh}$, at one particular collector of Participating Collectors and signal quality
            is lilely to remain high for some period of time (for example, particular user is very close
            to a particular collector as determined by signal time-of-arrival and signal strength),
                Select particular collector as Primary Collector for particular user and set Desired
                Bandwidth Level for Primary Collector to Primary Minimum value, (for example,
                xx = 10),
                Set Desired Bandwidth Level for Other Collectors to Secondary Minimum value,
                (for example, xx = 00 which is full off mode)
            Else,
                IF signal quality of Combined Signal from multiple collectors is greater than a first
                intermediate quality threshold, $T_{decrease}$ (for example, if GFR of TABLE 5 is greater
                than 99.8%) and signal quality is likely to remain high for some period of time (for
                example, Combined Signal quality has been stable and above the threshold, $T_{decrease}$
                for a sufficient period of time),
                      Decrease Desired Bandwidth Level for each of Participating Collectors
                      from one Intermediate value (for example, xx = 01, yy = 11) for all Participat-
                      ing Collectors to a lower Intermediate value (for example, xx = 01, yy = 01),
                IF signal quality of Combined Signal from multiple collectors is less than a second
                intermediate quality threshold, $T_{increase}$ (for example, if GFR of TABLE 5 is less than
                97%),
                Increase Desired Bandwidth Level for each of Participating Collectors
                from one Intermediate value (for example, xx = 0, yy = 11) for all Partici-
                pating Collectors to a higher Intermediate value (for example, xx = 11, –
                yy = 01),
            IF signal quality of Combined Signal is less than a low quality threshold, $T_{full}$ (for
            example, if GFR of TABLE 5 is less than 94%),
                Increase Desired Bandwidth Level for all Participating Collectors to
                Maximum value (for example, xx = 11, yy = 11),
            IF Current Parameters match Stored Parameters whereby it is anticipated that
            signal quality of the Combined Signal will become poor (for example, where the
            location of the user is approaching a location where signal quality is historically
            known to be poor for users),
                Set Desired Bandwidth Level to Stored value (for example, xx = 11,
                yy = 11 which is maximum bandwidth)

Adjusting Desired Bandwidth Level Based Upon Available Bandwidth Module

For each collector,
        Determine collector-to-aggregator Total Available Bandwidth for all users and
        determine Total Remaining Bandwidth available,
        FOR all user backhaul links coming into collector
            Order all the users by final signal quality at aggregator,
            IF based on Desired Bandwidth Level for all users, Total Remaining
            Bandwidth is greater than 0,
                Increase the bandwidth allocation (Desired Bandwidth Level
                ) of those users having signals with the lowest aggregated final
                signal quality that aren't already at maximum bandwidth level,
            If based on Desired Bandwidth Level for all users, Total Remaining
            Bandwidth is less than 0,
                Decrease the bandwidth allocations (Desired Bandwidth
                Level) of users having signals with the highest aggregated final
                signal quality until available bandwidth fits within limits of link
                (Total Remaining Bandwidth equals 0)
            Set Central Band Width Level equal to Desired Bandwidth Level (as
            increased or decreased based upon available bandwidth)
            Forward Central Bandwidth Level to Participating Collectors, Adjusting Collector Quality Parameters Module Adjust collector signal quality thresholds and other bandwidth parameters based, for example,
    on number of users in the system, available bandwidth, historical time-of-day patterns, and
    facilities availability.
    REPEAT Multiple Zone Configurations—FIG. 10 and FIG. 11

Figure 10:
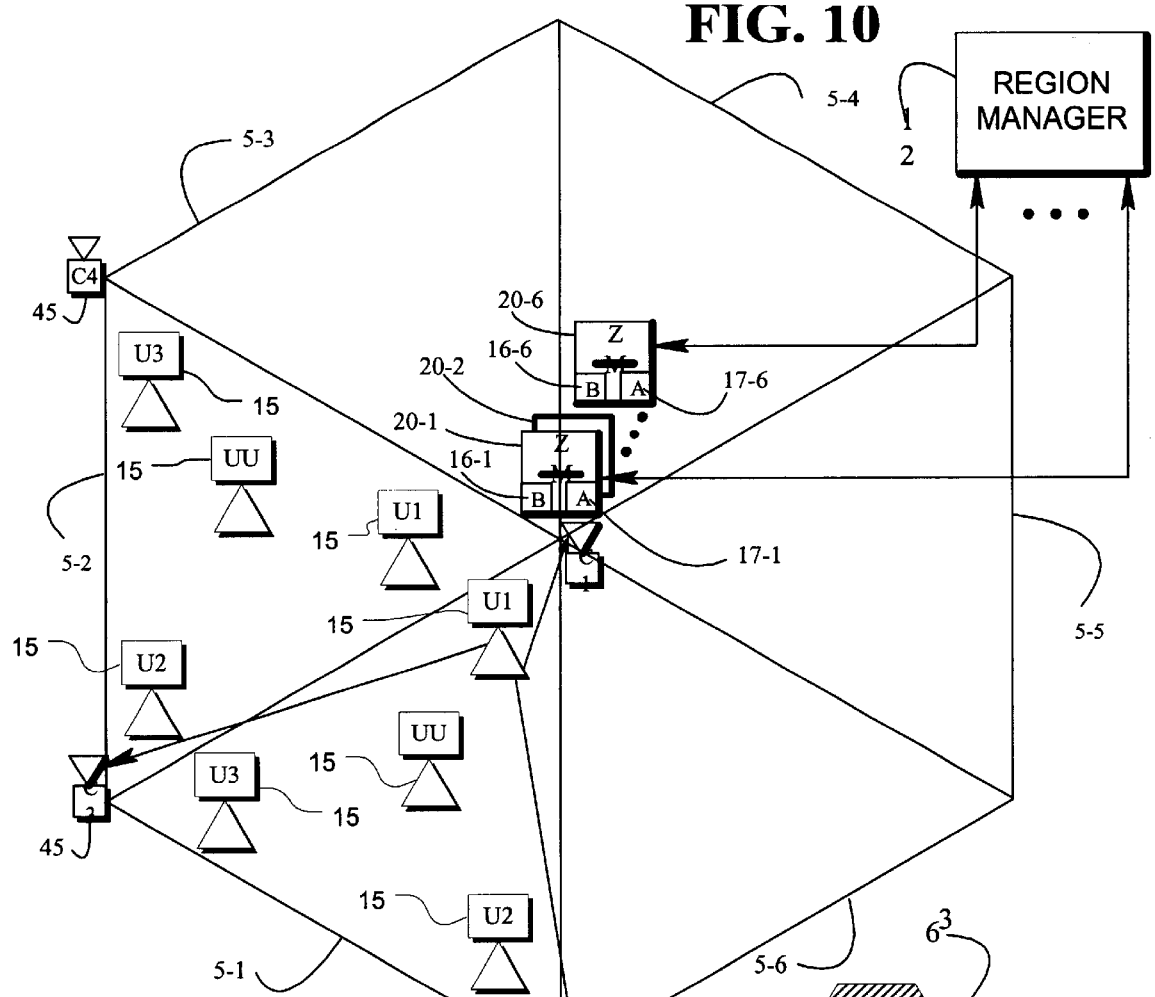
FIG. 10 and FIG. 11 depict representations of multiple zones of the FIG. 1 type in a cellular system.

In FIG. 10, the zones 5, including the zones 5-1, 5-2, ..., 5-6, are like the zone 5 of FIG. 1 and each zone 5 includes users 15 like those for zone 5-1. For example, zone 5-2 is adjacent to zone 5-1 and includes a C4 collector 45 that operates together with at least the collectors C1 and C2 that operate with zone 5-1.

In FIG. 10, the cellular system is shown having zone managers 20-1, ..., 20-6 of which zone manager 20-1 is typical. The zone managers have broadcasters 16-1, ..., 16-6, where broadcaster 16-1 is typical, that broadcast forward channel (FC) communications to multiple users 15 in one or more of the zones 5-1, ..., 5-6. Each of the users 15 transmits reverse channel (RC) communications to one or more of multiple collectors 45 including collectors C1, C2, C3 and C4, which in turn forward the reverse channel communications to aggregators 17-1, ..., 17-6, where aggregator 17-1 is typical. The zone managers 20 can be located at a base station that is configured in a number of different ways. In one configuration, each broadcaster broadcasts forward channel communications in a different one of six sectors in six different frequency ranges corresponding to the zones 5-1, 5-2, ..., 5-6. The users in the different zones transmit reverse channels on corresponding frequency ranges to the various collectors operating in their broadcast ranges and the collectors in turn forward reverse channel communications to a corresponding one of the aggregators 17. In another configuration, all of the zones use the same frequency ranges and no sectorization is employed and in such an embodiment one or more zone managers may be employed. In general, regardless of the configuration, some collector sites are associated with collectors for several zones. For example, C3 services users in two zones, 5-1 and 5-2. The backhaul link from C3 to the aggregator 17-1 is shared by users from zones 5-1 and 5-2.

In order to conserve bandwidth, the confidence metric bandwidth for one zone is at times reduced in order to permit an increase in the bandwidth of another zone where the zones are sharing reverse channels communication bandwidth from common associated collectors, like collectors C1 and C3 in the example described. Control of the algorithms used in each collector for determining the bandwidth used by each collector are stored and executed in the confidence metric processing unit 49 of FIG. 4 and processing unit 70 of FIG. 8. Further, the zone manager 20 of FIG. 1 communicates with the processing units 49 and 70 over the remote interfaces 65 when adjustments, such as for bandwidth balancing, are required.

In FIG. 10, the region manager 12 controls the bandwidth allocation of the zone managers 20-1, ..., 20-6 for the contiguous regions 5-1, ..., 5-6 and for other regions 5' which may or may not be contiguous to the regions 5-1, ..., 5-6.

Figure 11:
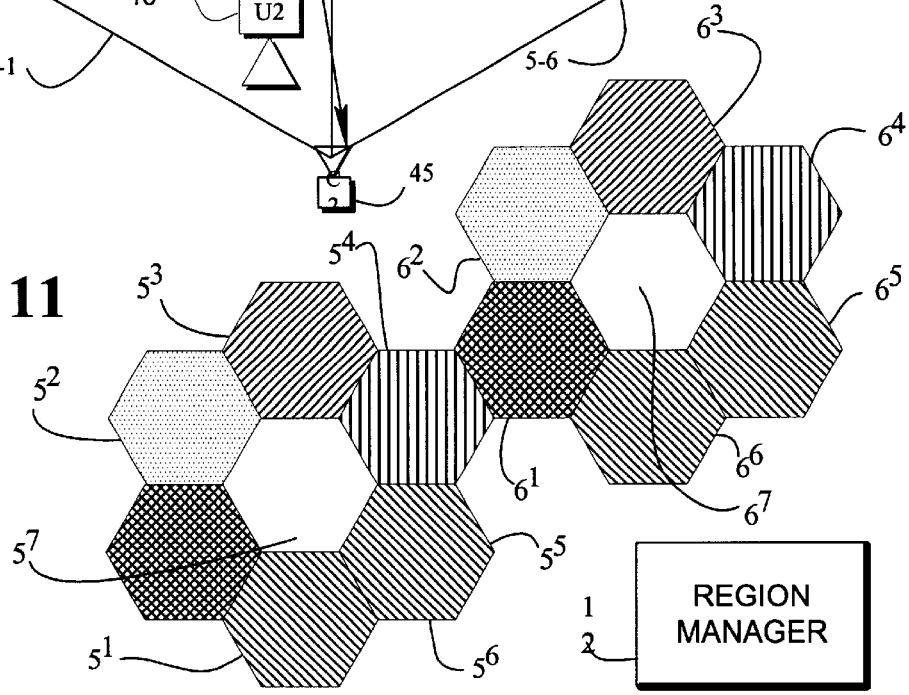

In FIG. 11, the zones $5^1, 5^2, \ldots, 5^7$ are each like the zone 5 of FIG. 10 and form a seven zone cluster. Similarly, in FIG. 11, the zones $6^1, 6^2, \ldots, 6^7$ are each like the zone 5 of FIG. 10 and form a second seven zone cluster. Any number of additional zone clusters may be provided as necessary to cover any particular region. The region manager 12 of FIG. 11 functions to control the bandwidth values of the collector reverse channels in order to balance the load among the various regions of FIG. 11 along common backhaul channels. For example, if traffic tends to move from one particular zone to another zone during a certain time (such as during a rush hour commute), the bandwidth of the common backhaul channel is dynamically allocated so that the zone with higher traffic is allocated more bandwidth.

Figure 12:
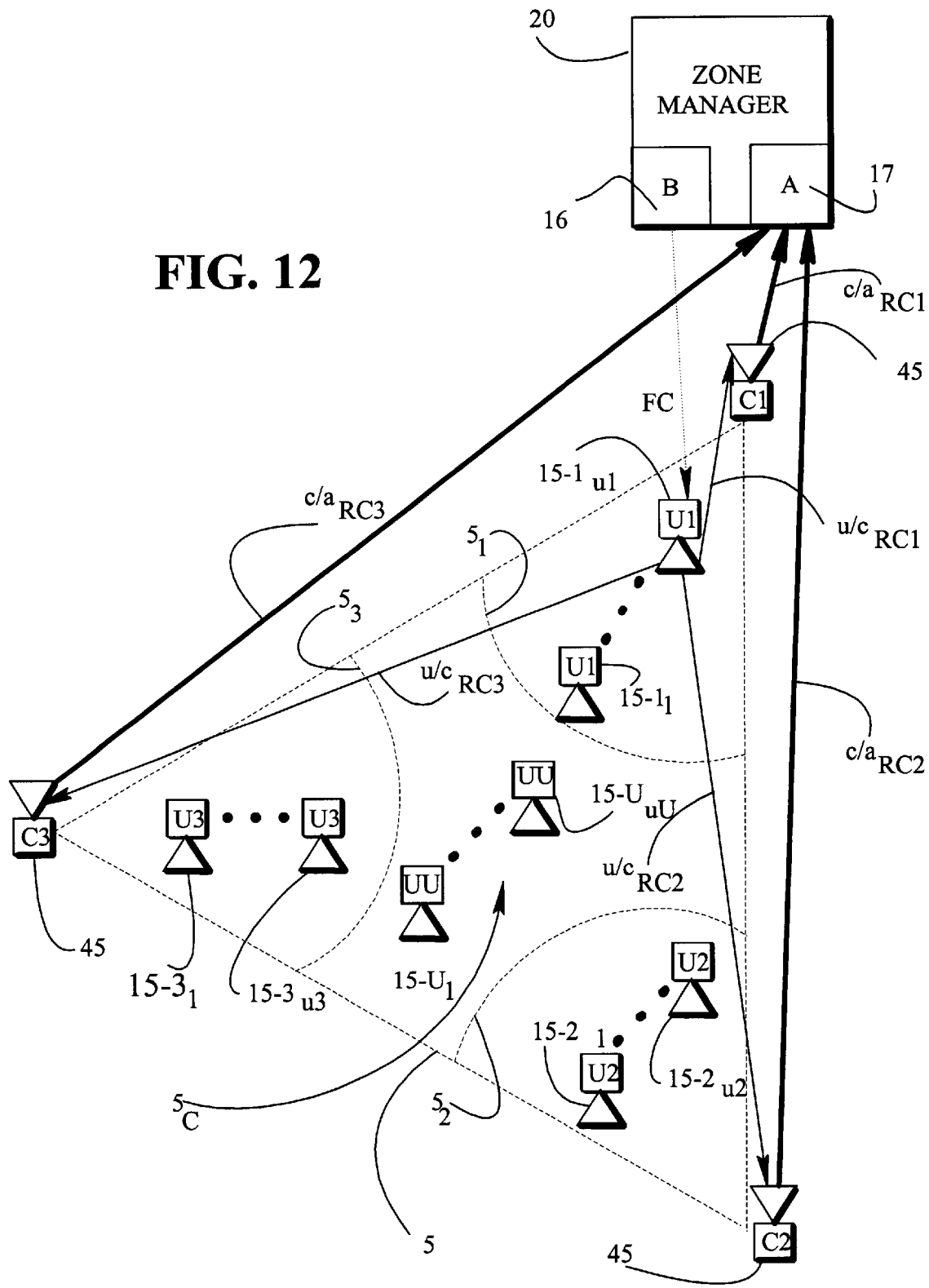
FIG. 12 depicts representations of multiple zones of the FIG. 1 type in a cellular system with users located in subzones.

Subregion Control—FIG. 12

In FIG. 12, a cellular system like that in FIG. 1 is shown having a zone manager 20 that broadcasts forward channel (FC) communications from broadcaster 16 to multiple users 15 including users U1, U2, ..., UU located within a zone 5 designated by the dashed-line triangle. Each of the multiple users 15 transmits reverse channel (RC) communications to one or more of multiple collectors 45 including collectors C1, C2 and C3, which in turn forward the reverse channel communications to aggregator 17 in zone manager 20.

Each of the users 15 has a receiver antenna for receiving broadcasts on the forward channel from the broadcaster 16. Also, each of the users 15 has a transmitter that transmits on a reverse channel to the collectors 45. The collectors 45 are sited at macro-diverse locations relative to each other within zone 5. Therefore, multiple copies of macro-diverse reverse channel communications are received at the aggregator 17 for each user.

In FIG. 12, the U1 user 15 is typical with forward channel (FC) communication from broadcaster 16, the user-to-collector reverse channel communications ($^{u/c}$RC) to each of the C1, C2 and C3 collectors 45, and the collector-to-aggregator reverse channel communications ($^{c/a}$RC) for each of the collectors to aggregator 17. The reverse channel communications from the U1 user 15 include the user-to-collector communication $^{u/c}$RC1 and the collector-to-aggregator communication $^{c/a}$RC1, the user-to-collector communication $^{u/c}$RC2 and the collector-to-aggregator communication $^{c/a}$RC2 and the user-to-collector communication $^{u/c}$RC3 and the collector-to-aggregator communication $^{c/a}$RC3. Each of the other users U2, ..., UU in FIG. 12 has similar forward and reverse channel communications.

In FIG. 12, the U1 users $15\text{-}1_1, \ldots, 15\text{-}1_{u1}$ are all located in a subregion bounded by the collector C1 and the arc $5_1$ and hence are in close proximity to the collector C1. Because of the close proximity, the signal strength of the reverse channel transmissions from the U1 users $15\text{-}1_1, \ldots, 15\text{-}1_{u1}$ to collector C1 is normally high and can be expected to require a low confidence metric bandwidth level for high quality reverse channel transmissions. Similarly, the U2 users $15\text{-}2_1, \ldots, 15\text{-}2_{u2}$ are all located in a subregion bounded by the collector C2 and the arc $5_2$ and hence are in close proximity to the collector C2 and the U3 users $15\text{-}3_1, \ldots, 15\text{-}3_{u3}$ are all located in a subregion bounded by the collector C3 and the arc $5_3$ and hence are in close proximity to the collector C3. Similarly, because of the close proximity, the signal strength of the reverse channel transmissions from the U2 users $15\text{-}2_1, \ldots, 15\text{-}2_{u2}$ to collector C2 is normally high and can be expected to require a low confidence metric bandwidth level for high quality reverse channel transmissions and because of the close proximity, the signal strength of the reverse channel transmissions from the U3 users $15\text{-}3_1, \ldots, 15\text{-}3_{u3}$ to collector C3 is normally high and can be expected to require a low confidence metric bandwidth level for high quality reverse channel transmissions.

In FIG. 12, the central subregion $5_c$ generally bounded by the arcs $5_1$, $5_2$ and $5_3$ are relatively far from the collectors C1, C2 and C3 so that the reverse channel signal strength from all of the UU users $15\text{-}U_1, \ldots, 15\text{-}U_{uU}$ in this region to each of the collectors C1, C2 and C3 is normally weaker than for users closer to the collectors in the subregions $5_1$, $5_2$ and $5_3$ can be expected to require a higher confidence metric bandwidth level for high quality reverse channel transmissions.

While the invention has been particularly shown and described with reference to preferred embodiments thereof it will be understood by those skilled in the art that various changes in form and details may be made therein without departing from the spirit and scope of the invention.

What is claimed is:

1. A communication system having a plurality of channels comprising,
broadcaster means including a plurality of macro-diverse broadcaster transmitters for broadcasting forward channel signals and a broadcaster control for controlling the broadcaster transmitters,
a plurality of users for receiving the forward channel signals and for transmitting user signals in user channels,
a plurality of macro-diverse collector means distributed at macro-diverse locations, each of said collector means including,
collector receiver means for receiving said user signals and providing a plurality of received signals for each of said plurality of users,
collector processing means for processing said received signals to form collector signals including sequences of data bits representing the received signals and including initial confidence metrics corresponding to said data bits for each of said plurality of users, where the initial confidence metrics are represented by an initial number of metric bits,
said collector processing means including collector confidence metric processing means for processing said initial confidence metrics to form processed confidence metrics having bandwidth values,
aggregator means for combining said collector signals using said processed confidence metrics from said plurality of macro-diverse collector means for each of said plurality of users to form a final sequence of data bits representing the user signals for each of said plurality of users,
bandwidth control means for controlling said bandwidth values.

2. The communication system of claim 1 wherein said bandwidth control means is static whereby said bandwidth values are fixed according to initial setup conditions.

3. The communication system of claim 1 wherein said bandwidth control means is dynamic whereby said bandwidth values are modified according to conditions that change during the operation of said communication system as a function of time.

4. The communication system of claim 3 wherein said bandwidth control means includes local bandwidth control means in said collector processing means.

5. The communication system of claim 3 wherein said bandwidth control means includes central bandwidth control means in said aggregator means.

6. The communication system of claim 3 wherein said bandwidth control means includes,
for each of said plurality of macro-diverse collector means, local bandwidth control means for controlling bandwidth levels,
central bandwidth control means in said aggregator means receiving information from said plurality of macro-diverse collector means to provide central information for setting bandwidth levels for said macro-diverse collector means,
control channel means connecting said central bandwidth control means to said local bandwidth control means in said plurality of macro-diverse collector means for sending said central information to control the bandwidth levels of said macro-diverse collector means.

7. The communication system of claim 6 wherein at each particular macro-diverse collector means of said plurality of macro-diverse collector means, said local bandwidth control means includes local processing means for processing local information at said particular macro-diverse collector means to set the bandwidth level of said particular macro-diverse collector means.

8. The communication system of claim 7 wherein said local processing means receives said central information and sets the bandwidth level of said particular macro-diverse collector means based upon said central information and said local information.

9. The communication system of claim 7 wherein said local information is based on signal quality.

10. The communication system of claim 7 wherein said local information is based on signal quality measured against a plurality of quality thresholds.

11. The communication system of claim 7 wherein said central information is based on current parameters and stored parameters.

12. The communication system of claim 11 wherein said current parameters are the location of a user and the stored parameters are known poor signal quality locations in a zone.

13. The communication system of claim 6 wherein said central bandwidth control means includes a plurality of modules executable for controlling bandwidth values.

14. The communication system of claim 13 wherein said plurality of modules include a module for determining collector signal quality.

15. The communication system of claim 13 wherein said plurality of modules include a module for selecting participating collectors.

16. The communication system of claim 13 wherein said plurality of modules include a module for combining collector signals.

17. The communication system of claim 13 wherein said plurality of modules include a module for centralized determining collector bandwidth.

18. The communication system of claim 13 wherein said plurality of modules include a module for updating collector bandwidth usage.

19. The communication system of claim 13 wherein said plurality of modules include a module for adjusting collector quality parameters.

20. The communication system of claim 1 wherein said collector confidence metric processing means processes said initial confidence metrics to form processed confidence metrics represented by a processed number of metric bits fewer than said initial number of metric bits.

21. The communication system of claim 1 wherein said aggregator means includes aggregator confidence metric processing means for processing said processed confidence metrics to form aggregator confidence metrics for each of said data bits.

22. The communication system of claim 1 wherein said collector processing means includes group processing means for processing said initial confidence metrics in groups to form said processed confidence metrics as grouped confidence metrics having grouped numbers of confidence metric bits fewer than said initial number of metric bits.

23. The communication system of claim 1 wherein the initial confidence metrics have an initial range, $a_{in}$, represented by an initial number of metric bits, $\gamma_{in}$, and said collector confidence metric processing means includes range processing means for processing the initial confidence metrics to form processed confidence metrics having a processed range, $a_p$, represented by a processed number of metric bits, $\gamma_p$, where the processed number of metric bits, $\gamma_p$ is less than the initial number of metric bits, $\gamma_{in}$.

24. The communication system of claim 1
wherein said collector processing means includes group processing means for processing said initial confidence metrics having an initial range, $a_{in}$, represented by an initial number of metric bits, $\gamma_{in}$, in groups, $CM_1, \ldots, CM_G$, to form grouped confidence metrics including the confidence metrics $CM_1, \ldots, CM_{g1}$ for group G1; $CM_{(g1+1)}, \ldots, CM_{g2}$; for group G2; $\ldots$; $CM_{(g3+1)}, \ldots, CM_{gG}$ for group GG having grouped numbers of confidence metric bits, $\gamma_g$, fewer than said initial number of metric bits,
wherein said collector confidence metric processing means includes range processing means for processing the grouped confidence metrics having an initial range, $a_{in}$, represented by an initial number of metric bits, $\gamma_{in}$, to form processed confidence metrics having a processed range, $a_p$, represented by a processed number of metric bits, $\gamma_p$, where the processed number of metric bits, $\gamma_p$ is less than the initial number of metric bits, $\gamma_{in}$,
wherein said aggregator means includes aggregator confidence metric processing means for processing said processed confidence metrics to form aggregator confidence metrics for each of said data bits.

25. The communication system of claim 1 wherein,
said collector receiver means includes a plurality of micro-diversity receivers each for receiving said user signals and providing a plurality of micro-diverse received signals for each of said plurality of users,
said collector processing means processes said micro-diverse received signals to form said collector signals including sequences of data bits representing the micro-diverse received signals and including said initial confidence metrics corresponding to said data bits for each of said plurality of user.

26. The communication system of claim 1 wherein said aggregator means receives, from $N_c$ of said collector means, $N_c$ macro-diverse collector signals each having a processed confidence metric value, $^\alpha c_b$ for each bit and combines said processed confidence metric values to form an average processed confidence metric, $^{agg}c_b$, as follows:

$$^{agg}c_b = \frac{1}{N_c}\sum_{\alpha=1}^{N_c} {}^\alpha s_b({}^\alpha c_b + 1)$$

where,
$^{agg}c_b$=average processed confidence metric
$^\alpha c_b$=number ranging between (0) and (+α)
$^\alpha s_b$=sign
$N_c$=number of macro-diverse collector signals.

27. The communication system of claim 1 wherein said aggregator means receives, from $N_c$ of said collector means, $N_c$ macro-diverse collector signals each having a processed confidence metric value, $^\alpha c_b$ for each bit and each having a weighting factor, $^\alpha w_b$, for each bit and combines said processed confidence metric values to form a weighted average confidence metric, $^{agg}c_b$, as follows:

$$^{agg}c_b = \frac{1}{N_c}\sum_{\alpha=1}^{N_c} {}^\alpha w_b {}^\alpha s_b({}^\alpha c_b + 1)$$

where,
$^{agg}c_b$=weighted average processed confidence metric
$^\alpha c_b$=number
$^\alpha s_b$=sign
$N_c$=number of macro-diverse collector signals
$^\alpha w_b$=weighting factor for each bit.

28. The communication system of claim 1 wherein said user signals employ multiple access protocols.

29. The communication system of claim 28 wherein said user signals employ TDMA protocols.

30. The communication system of claim 28 wherein said user signals employ CDMA protocols.

31. The communication system of claim 28 wherein said user signals employ SDMA protocols.

32. The communication system of claim 28 wherein said user signals employ FDMA protocols.

* * * * *